(12) United States Patent
Trubko et al.

(10) Patent No.: US 8,451,318 B2
(45) Date of Patent: May 28, 2013

(54) THREE-MIRROR PANORAMIC CAMERA

(75) Inventors: Sergey Trubko, Shrewsbury, MA (US); Venkat Peri, Brookline, MA (US)

(73) Assignee: Remotereality Corporation, Westborough, MA (US)

(*) Notice: Subject to any disclaimer, the term of this patent is extended or adjusted under 35 U.S.C. 154(b) by 800 days.

(21) Appl. No.: 12/540,557

(22) Filed: Aug. 13, 2009

(65) Prior Publication Data

US 2010/0201781 A1     Aug. 12, 2010

Related U.S. Application Data

(60) Provisional application No. 61/088,983, filed on Aug. 14, 2008.

(51) Int. Cl.
*H04N 7/00* (2006.01)
(52) U.S. Cl.
USPC ........ 348/36; 348/E5.024; 348/335; 359/725; 359/366
(58) Field of Classification Search
USPC ............... 348/36, E5.024, 335; 359/725, 366
See application file for complete search history.

(56) References Cited

U.S. PATENT DOCUMENTS

| | | | |
|---|---|---|---|
| 2,299,682 A | 10/1942 | Conant | |
| 4,056,827 A * | 11/1977 | Spooner et al. | 348/36 |
| 4,101,195 A | 7/1978 | Frosch et al. | |
| 4,395,093 A | 7/1983 | Rosendahl et al. | |
| 4,484,801 A | 11/1984 | Cox | |
| 4,804,258 A | 2/1989 | Kebo | |
| 4,964,706 A | 10/1990 | Cook | |
| 5,170,284 A | 12/1992 | Cook | |
| 5,173,801 A | 12/1992 | Cook | |
| 5,627,675 A | 5/1997 | Davis et al. | |
| 5,710,661 A | 1/1998 | Cook | |
| 5,760,826 A | 6/1998 | Nayar | |
| 5,790,181 A | 8/1998 | Chahl et al. | |
| 5,920,376 A | 7/1999 | Bruckstein et al. | |

(Continued)

FOREIGN PATENT DOCUMENTS

| | | |
|---|---|---|
| EP | 0 816 891 A1 | 1/1998 |
| EP | 1 145 065 B1 | 8/2004 |

(Continued)

OTHER PUBLICATIONS

International Search Report in PCT/US2009/053674 dated Dec. 7, 2009.

*Primary Examiner* — Alina N. Boutah
(74) *Attorney, Agent, or Firm* — Gilberto M. Villacorta; Foley & Lardner LLP

(57) ABSTRACT

A system and method for obtaining images having an ultra-wide field of view angle. A panoramic camera includes two subsystems: an optical subsystem and an image sensor. The optical subsystem includes at least a three-aspheric mirrors for producing an image of objects in the ultra-wide field of view. The produced images are correctable by a standard optical element to produce on an image plane an image having an optical resolution approximately equal or exceeding the Nyquist sampling criterion for the image sensor. A first mirror provides a sharp, compressed, virtual image using a convex paraboloidal or hyperboloidal mirror. Second and third mirrors redirect light onto the correction element through a folded optical path. The standard optical element projects a virtual image onto the image sensor. Image processing software can be used to decompress and unwrap the ultra-wide angle image captured by the image sensor.

32 Claims, 26 Drawing Sheets

U.S. PATENT DOCUMENTS

| | | | |
|---|---|---|---|
| 6,130,783 A | 10/2000 | Yagi et al. | |
| 6,175,454 B1 | 1/2001 | Hoogland et al. | |
| 6,185,044 B1 * | 2/2001 | Yoshikawa et al. | 359/629 |
| 6,259,826 B1 * | 7/2001 | Pollard et al. | 382/284 |
| 6,304,285 B1 * | 10/2001 | Geng | 348/36 |
| 6,449,103 B1 | 9/2002 | Charles | |
| 6,480,229 B1 | 11/2002 | Driscoll, Jr. et al. | |
| 6,611,282 B1 * | 8/2003 | Trubko et al. | 348/36 |
| 6,765,566 B1 * | 7/2004 | Tsao | 345/419 |
| 6,963,355 B2 * | 11/2005 | Simon et al. | 348/36 |
| 6,963,375 B1 * | 11/2005 | Lundberg | 348/335 |
| 7,334,902 B2 * | 2/2008 | Streid et al. | 353/98 |
| 7,362,517 B2 * | 4/2008 | Togino | 359/725 |
| 7,400,347 B2 | 7/2008 | Krogmann et al. | |
| 7,884,849 B2 | 2/2011 | Yin et al. | |
| 7,940,299 B2 * | 5/2011 | Geng | 348/143 |
| 7,952,606 B2 * | 5/2011 | Kweon et al. | 348/36 |
| 2001/0043280 A1 * | 11/2001 | Suda | 348/341 |
| 2003/0133204 A1 * | 7/2003 | Chen et al. | 359/861 |
| 2003/0136843 A1 * | 7/2003 | Ralph et al. | 235/462.33 |
| 2005/0083595 A1 * | 4/2005 | Mostrom | 359/869 |
| 2006/0106307 A1 * | 5/2006 | Dione et al. | 600/437 |
| 2008/0074507 A1 * | 3/2008 | Ohara et al. | 348/222.1 |
| 2008/0192139 A1 * | 8/2008 | Kanai et al. | 348/360 |
| 2008/0239136 A1 * | 10/2008 | Kanai et al. | 348/340 |
| 2009/0052050 A1 * | 2/2009 | Kweon et al. | 359/668 |
| 2009/0135253 A1 * | 5/2009 | Augst | 348/148 |
| 2009/0231481 A1 * | 9/2009 | Sasaki | 348/342 |
| 2009/0303355 A1 * | 12/2009 | Hayashi | 348/241 |
| 2009/0322928 A1 * | 12/2009 | Robinson et al. | 348/340 |
| 2011/0193987 A1 * | 8/2011 | Wong et al. | 348/222.1 |
| 2011/0209550 A1 * | 9/2011 | Seagrave | 73/649 |

FOREIGN PATENT DOCUMENTS

| | | |
|---|---|---|
| EP | 1 452 899 | 9/2004 |
| EP | 1 772 761 A1 | 4/2007 |
| EP | 1 764 639 B1 | 11/2009 |

* cited by examiner

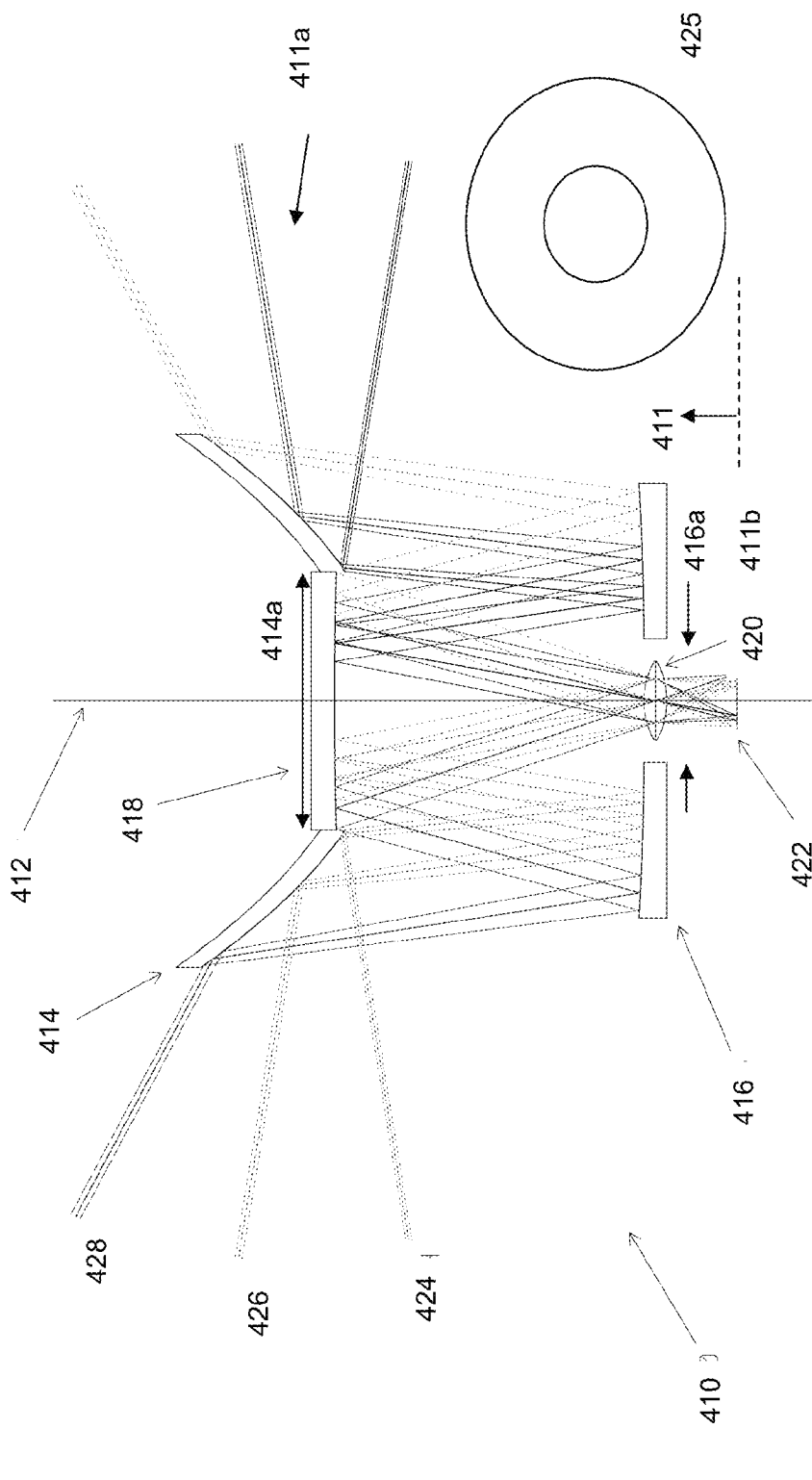

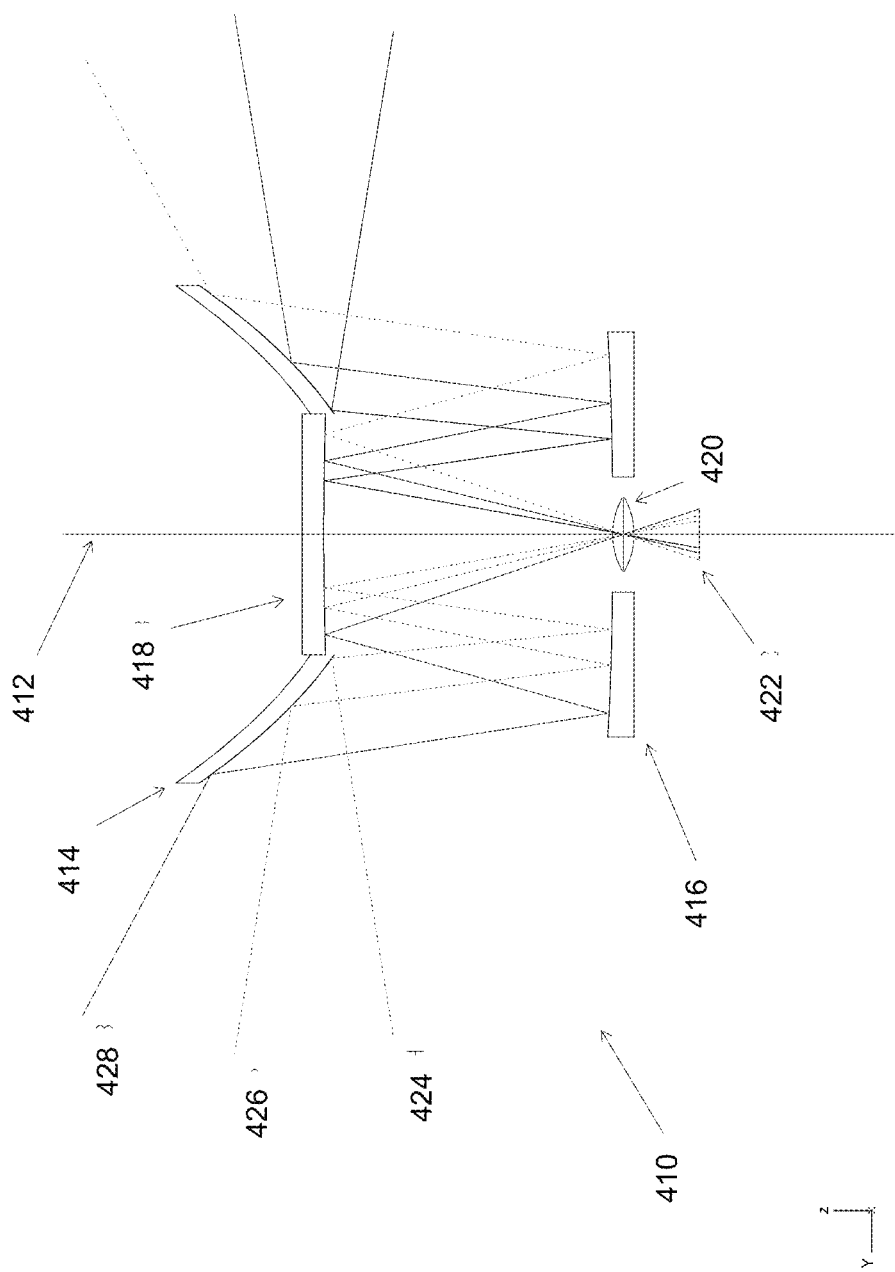

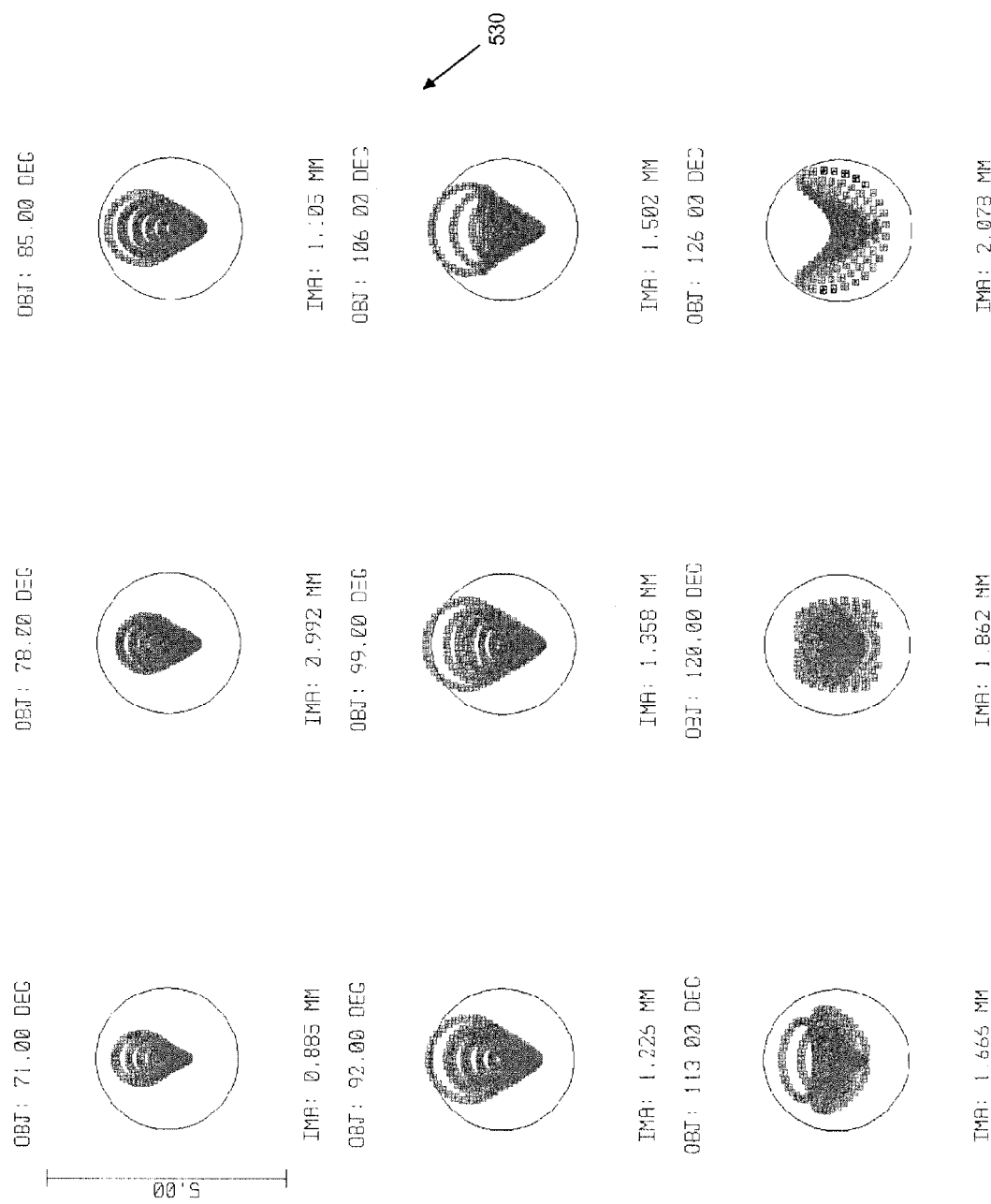

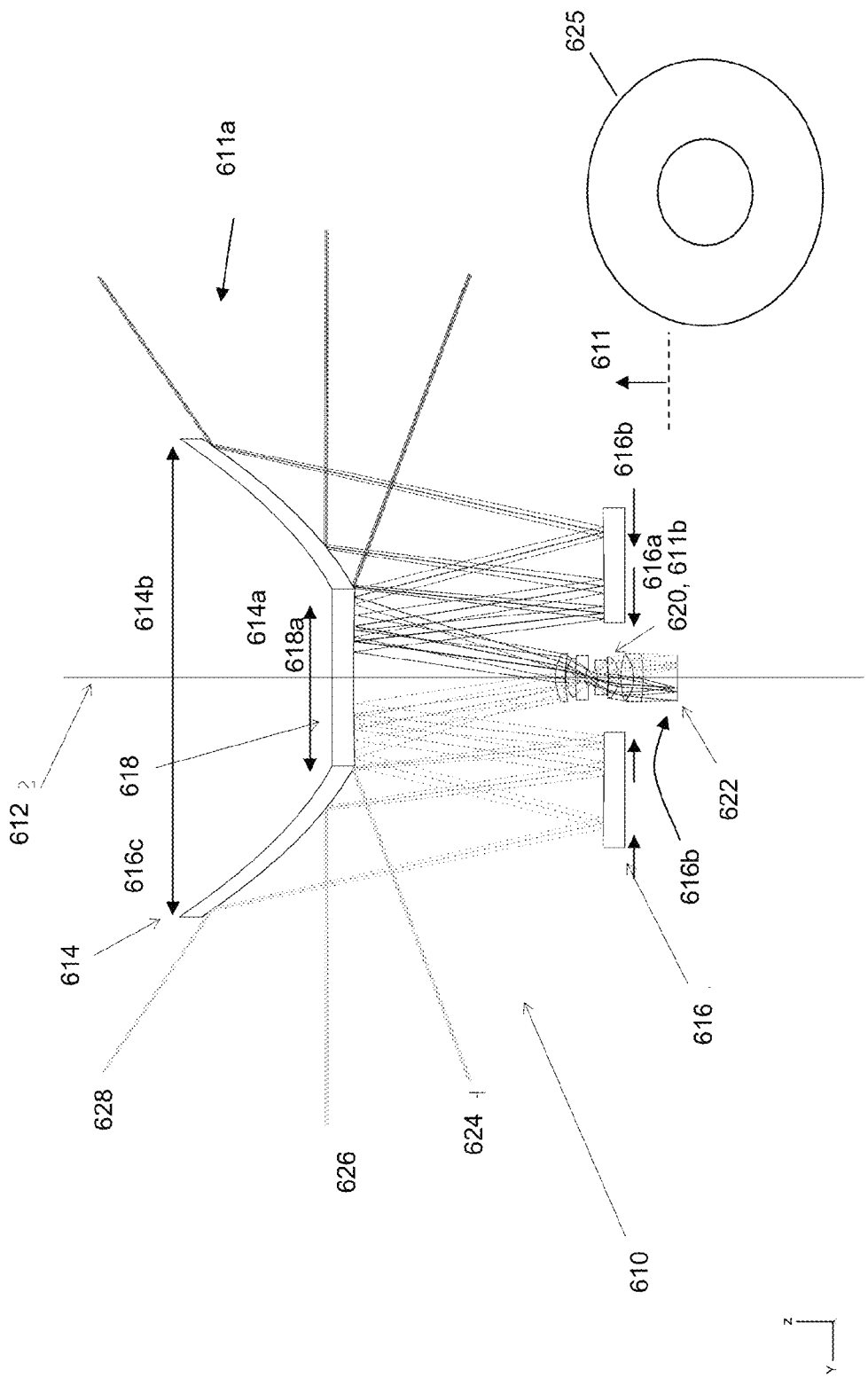

THREE-MIRROR PANORAMIC CAMERA

CROSS-REFERENCE TO RELATED APPLICATIONS

This application claims priority to U.S. Provisional Application No. 61/088,983 filed Aug. 14, 2008, the entire disclosure of which is incorporated herein by reference.

FIELD

The present invention relates to image sensing. More particularly, the present invention relates to panoramic cameras adapted for ultra-wide field of view angles.

BACKGROUND

There are presently known many panoramic imaging cameras and optical systems that use a variety of refractive and reflective optical components. Fish-eye lenses, for example, are built strictly from refractive lenses. Fish-eye lenses can cover very wide fields of view, up to 220 degrees. Disadvantages of fish-eye lenses are well known. Among of the disadvantages are non-uniform image illumination and resolution across a wide field of view. A pure refractive optical system, such as fish-eye lens, is commonly called a dioptric optical system.

Another type of panoramic imaging system comprises mirrors and lenses. This type of optical system is called a catadioptric optical system. Catadioptric optical systems usually use one or two concave and/or convex mirrors and one or two relay lenses, usually placed behind the mirrors. Catadioptric systems have been developed to achieve a super-wide-angle field of view.

A simple catadioptric system with one mirror and one relay lens was introduced by James S. Conant (U.S. Pat. No. 2,299,682). The patent describes a convex parabolic or hemispherical mirror which creates a curved virtual image, projected by a camera lens onto a photographic film or plate. In this case, a standard camera lens serves as a relay lens. The main disadvantage of the Conant optical system, as with most wide-angle optical systems, is poor image quality due to uncorrected field aberrations like astigmatism and field curvature.

Reducing the aforementioned deleterious effects produces sharper images. Further, a higher F-stop number is necessary and an exposure time must be increased to maintain image quality for stills and to increase frame rates for video recording.

Significant improvement in the Conant optical system was made by Shree K. Nayar, inventor of a panoramic camera using a convex parabolic mirror with a telecentric relay objective lens and a standard camera lens, which renders a hemispherical scene from a single point of view onto a two-dimensional format (U.S. Pat. No. 5,760,826).

The main disadvantage of the Nayar optical system is an uncorrected field curvature, reducing image quality, particularly in compact optical systems with low F-stops. To get satisfactory sharp images, the F-stop for the Nayar optical system should be set greater than or equal to 8, depending on the sensor format, and as a consequence, greater object illumination and longer exposure times are required. Greater illumination requires using bulky overall packages, as parabolic mirror diameters should be on the order of 3-4 inches, with optical system lengths of about 12 inches.

Another attempt to improve image quality in catadioptric panoramic optical systems with parabolic mirrors was recited by Edward Driscoll, Jr. et al. (U.S. Pat. No. 6,480,229 B1). In the Driscoll optical system, two field-flattening correction lenses are introduced. A first correction lens is positioned between a parabolic mirror and a camera lens; a second correction lens is positioned between the camera lens and a sensor plane. The first correction lens corrects for astigmatism; the second correction lens corrects for field curvature. No detailed description of either correction lens is recited in the Driscoll patent, no data are provided about level of this type of correction or achieved optical image quality. Further, astigmatism and field curvature effects are difficult to separate if the field-flattening lens does not lie in the image plane. The Driscoll optical system is a derivative of the second Nayar optical system, where the first and second correction lenses in the Driscoll optical system replace the Nayar relay lens. Both optical systems improve the image quality of the original Conant optical system, which does not provide for field-flattening correction.

Javaan Singh Chahl, et al. (U.S. Pat. No. 5,790,181), Alfred M. Bruckstein, et al. (U.S. Pat. No. 5,920,376), and Yasushi Yagi, et al. (U.S. Pat. No. 6,130,783) address single-mirror and two-mirror panoramic optical systems without detailed description of optical image formation and optical image quality. Primarily, Chahl, Bruckstein, and Yagi recite principal rays and principle ray mapping onto the sensor plane. Ray bundles and the associated optical aberrations like uncorrected field curvature, astigmatism, and lateral color displacement are not addressed in these three patents. Higher F-stops are necessary for the optical systems represented in each of the three aforementioned patents to sharpen the image, yielding low image illumination levels and poor contrast.

To further correct field curvature in panoramic optical systems, Gottfried R. Rosendahl, et al. (U.S. Pat. No. 4,395,093) introduces a convex hyperbolic mirror used in conjunction with a custom objective lens comprising twenty one lens elements.

Arthur Cox (U.S. Pat. No. 4,484,801), in a similar approach, uses hyperbolic mirror and a custom objective lens containing 16 single lens elements to correct field aberrations and improve image quality. Both custom objective lens optical systems require a high F-stop, require complex optics, and in the end, do not eliminate high image compression.

Digital imaging optics allows for additional freedom in image quality correction, above and beyond that of photographic film optical systems, in the design of an integrated digital sensor and in the function of digital image processing software. High quality digital images, free of image compression and panoramic distortion, can be achieved by using panoramic optics with the integration of the digital sensor and image processing software into the optical system.

SUMMARY

None of the aforementioned patents integrate the three digital image components of optics, digital image sensor, and image processing into a panoramic optical system. Cox, for example, strictly addresses the optical system. Nayar (U.S. Pat. No. 5,760,826) and Chahl (U.S. Pat. No. 5,790,181) address the optical system and image compression on a digital image sensor plane. In general, image compression on a digital image sensor gives much lower resolution in the highly compressed regions of the image, and also introduces panoramic distortion. The collective issues of image compression, resolution, and panoramic distortion are not contemplated in any of the aforementioned patents, nor are these issues contemplated in any combination of the aforementioned patents.

The present invention fulfills needs present in the art by providing a compact, high-resolution, powerful, panoramic camera having at least three-mirrors. The camera offers wide utility, including teleconferencing, robotics vision, unmanned vehicles, surveillance, and other similar applications. In some embodiments, the compact panoramic camera is portable. A high-resolution panoramic camera implies a camera which provides sharp, undistorted panoramic images for an ultra-wide field of view, which in some embodiments can be a full field of view.

Additionally, the present invention provides for a relatively small f-stop to reduce the exposure time for the panoramic camera. The reduced exposure time is particularly important in video applications, where the panoramic camera f-stop and pixel sensitivity in the image sensor field or plane allow for video record up to and greater than 100 frames per second (FPS).

In one or more preferred embodiments, the invention relates to a system adapted for producing an image of objects in an ultra-wide field of view angle. The system includes an optical subsystem including at least three aspheric mirrors. A first convex, mirror of the optical subsystem defining a central aperture and an optical axis, a second aspheric mirror defining a central aperture, and a third mirror. The second aspheric mirror of the optical subsystem is disposed along an optical axis relative to the first convex aspheric mirror. The third aspheric mirror of the optical subsystem is also disposed along the optical axis at or near the first convex aspheric mirror central aperture. The at least three-mirror optical subsystem is adapted to direct reflected light from object space onto an optical correction element. An image of objects in the ultra-wide field of view angle is correctable by the standard optical element to produce on an image plane an image having an optical resolution approximately equal to or exceeding the Nyquist sampling criterion of an image detector.

In one or more preferred embodiments, the invention relates to a process of projecting onto an image sensor plane an image of one or more objects in an ultra-wide field of view. The process includes reflecting by a convex aspheric reflective surface one or more objects in the ultra-wide field of view to provide a first virtual image. The first virtual image is reflected by a second aspheric mirror to form a second image, wherein reflecting the first virtual image includes correcting one or more of a first image field curvature and a first image compression. The second image is reflected by a third aspheric mirror to form a third image, wherein reflecting the second image includes correcting one or more of a second image field curvature and a second image compression. The third image is focused with an optical correction element to project a diffraction limited image having an optical resolution approximately equal to or exceeding the Nyquist sampling criterion of an image detector.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 9A and 9B show a vertical cross-section of yet another exemplary embodiment of the invention.

FIG. 12 presents an image spot diagram for point source objects for the exemplary embodiment of the invention shown in FIGS. 11A and 11B.

FIGS. 14A and 14B show a vertical cross-section of yet another exemplary embodiment of the invention.

DETAILED DESCRIPTION OF THE PREFERRED EMBODIMENTS

Figure 1:
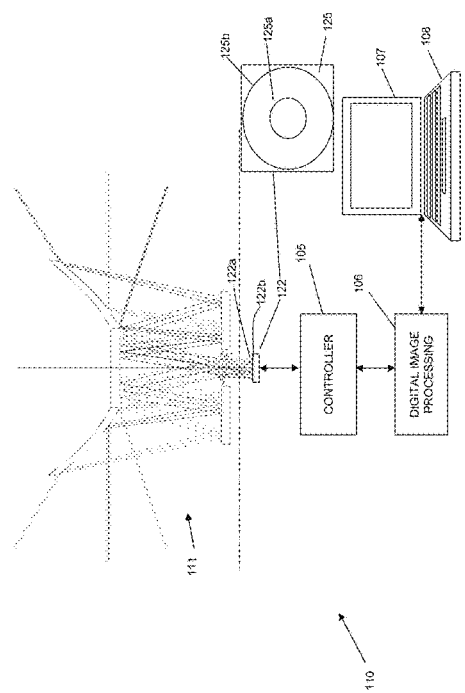
FIG. 1 shows a system block diagram of a panoramic camera according to a preferred embodiment of the present invention.

It should be appreciated that the particular implementations shown and described herein are examples of the present invention and are not intended to otherwise limit the scope of the present invention in any way. Further, the techniques are suitable for applications in teleconferencing, robotics vision, unmanned vehicles, or any other similar applications.

In some embodiments, the panoramic camera constructed according to the principals of the invention includes at least three parts. The first part comprises an optical system. The second part comprises a digital image sensor, attached to the optical system in such a way that a sensor plane of the digital image sensor coincides with an image plane of the optical system. The third part comprises image processing software, wherein the image processing software is installed on a computer or embedded in a PC board included in the digital camera electronics.

The optical system includes at least two subsystems. A first subsystem includes a three-mirror optical subsystem configured to capture an ultra-wide field of view. The three-mirror optical subsystem provides a double folding of the optical path yielding a compact profile along an optical axis. The compact profile is due at least in part to a double optical folding of the optical path provided by a combination of the second aspheric mirror and the third aspheric mirror to shorten an extent of the three-mirror optical subsystem along an optical axis. To characterize optical system package numerically a ratio can be determined as a length of a three-mirror optical subsystem measured along its optical axis to a diameter of its first aspheric mirror. In some single-mirror optical systems this length-to-diameter ratio can be as low as about 3.68 or more. The length-to-diameter ratio in the embodiment described herein can be as low as about 1.1-1.2 and less.

A second subsystem in optical communication with the first subsystem includes an optical correction element, such as one or more mirrors, one or more lenses, or a combination of one or more mirrors and one or more lenses. For example, the correction element can be a lens, such as a correction lens positioned to receive doubly-folded rays from the three-mirror optical system. The correction lens can include refractive objective lens assembly. In some embodiments, the correction lens includes a micro-projection lens (MPL). The optical system creates a source image of an object space (field of view) on an image plane. An image sensor is positioned at the image plane to capture the source image. The source image is a compressed image of the object space. In some embodiments, the object space includes up to 360 degree measured about an optical axis of the three-mirror optical subsystem. In some embodiments, image processing software is provided to process the captured source image, and to create a perspective panoramic view. For example, the 360 degree source image projected onto the image plane is a circular image (i.e., more comfortable to use polar coordinates). The image processing software can create the perspective panoramic view by essentially unwrapping the source image, re-creating a representation in Cartesian coordinates.

The optical subsystem includes at least three mirrors: a first convex aspheric mirror, a second aspheric mirror, and a third aspheric mirror. In a preferred embodiment, the first convex mirror comprises an optical axis, which is an axis of symmetry, and a curved, convex, aspheric mirror including a first mirror central aperture at one end. The first convex mirror can be defined by a curve (generator) and is a surface of revolution of the generator curve about an optical axis. The first mirror reflects rays from the field of view to form a first virtual and compressed image of the object space. In some embodiments, the second mirror is an aspheric mirror having a central aperture along the optical axis. Alternatively or in addition, the third mirror is also an aspheric mirror disposed along the optical axis. In one or more preferred embodiments, the second and third mirrors are different shapes. The second and third mirrors can also be defined by respective generator curves, and are surfaces of revolution about the optical axis. In some embodiments, the first, second, and third mirrors are axially symmetric about the optical axis. Further, in some embodiments, the mirrors are surfaces formed by partial revolution of the generator curve (i.e., less than 180 degrees) around the optical axis. A combination of the second mirror and the third mirror provides for a double optical folding to shorten a length along the optical axis of the three-minor optical subsystem, allowing for a more compact panoramic camera. In one or more preferred embodiments, the second and third mirrors in combination provide correction of high-order optical aberrations.

In some embodiments, the first convex aspheric mirror reflects incident rays toward the second aspheric mirror, which reflects the once reflected rays towards the third aspheric minor. The third aspheric mirror reflects the twice-reflected incident rays through the central aperture of the second aspheric minor. The thrice-reflected rays are directed from the third mirror to an optical correction element configured to produce an image on an image plane. The relative shapes of the three aspheric mirrors are selected to produce an image that is correctable by the optical correction element to produce an optical resolution approximately equal to or exceeding the Nyquist sampling criterion. Alternatively or in addition, the projected image also has a corrected field curvature less than about 0.015 mm$^{-1}$.

In some embodiments, the image plane may include a sensor including an array of discrete pixels. The Nyquist sampling criterion may be referred to as $1/(2*N)$, where 'N' is a pixel dimension. The pixel dimension N is a center-to-center pixel spacing, which also is called a pixel pitch. In some embodiments, the projected image has at least two lines per $2*N$, which corresponds to approximately 250 line pairs, or cycles per mm for currently available digital sensors with a pixel pitch of about 2 microns. In some embodiments, the projected image has at least 40 lines or cycles per mm. In some embodiments, the projected image has at least 100 lines or cycles per mm. In some embodiments, the projected image has at least 150 lines or cycles per mm. In some embodiments, the projected image has at least 200 lines or cycles per mm. In some embodiments, the projected image has at least 500 lines or cycles per mm. In some embodiments, the image plane may employ a color filter array (CFA) for arranging red, green, and blue (RGB) color filters on a grid of photosensors. One example of such a CFA is known as a Bayer pattern. A CFA, a Bayer pattern for example, may be used to acquire scene color information using a single sensor. The Nyquist sampling frequency of a CFA image plane can be lower for each color channel than for the collection or union of the color channels. Accordingly, the pixel spacing in the array of discrete pixels can be larger for each color channel than for the collection or union of the color channels.

In some analogous embodiments, the image plane may include a sensor including a photographic film rather than the array of discrete pixels. Accordingly, a grain size of the photographic film may be approximately analogous to the pixel dimension N for the array of discrete pixels, where a grain size diameter, a grain size edge, and a grain size center-to-center spacing may be analogous to the diameter, the edge, and the center-to-center spacing for the array of discrete pixels.

FIG. 1 shows a system block diagram of a panoramic camera 110 according to a preferred embodiment of the present invention. The panoramic camera 110 includes multiple subassemblies. A first subassembly is an optical system 111. A second subassembly includes a digital image sensor 122, mounted with respect to the optical system 111 in such a way that a sensor plane 122*a* of the digital image sensor 122 coincides with an image plane 122*b* of the optical system 111. The optical system 111 produces an image 125 on the image plane 122*b*. In some embodiments, the image is circular. For example, in some embodiments, an annular circular image 125 can be formed between an image inner circle 125*a* and an image outer circle 125*b*, as determined by the optical system 111.

A third subsystem includes a controller 105 configured to receive an electronic representation of the image captured by the digital image sensor 122. In some embodiments, image processing software 106 is provided for processing the captured image. The image processing software 106 can be used to accomplish among other things at least one of: automatically focusing the image 125, and manually focusing the image 125. A digital representation of the focused image is rendered and displayed to an end user. For example, the rendered focused image can be displayed onto a video display 107 at a user interface 108. The user interface 108 can include user controls allowing a user to manipulate the image processing software 106 for at least one of: functions to automatically focus the image 125 and functions to manually focus the image 125.

Figure 2:
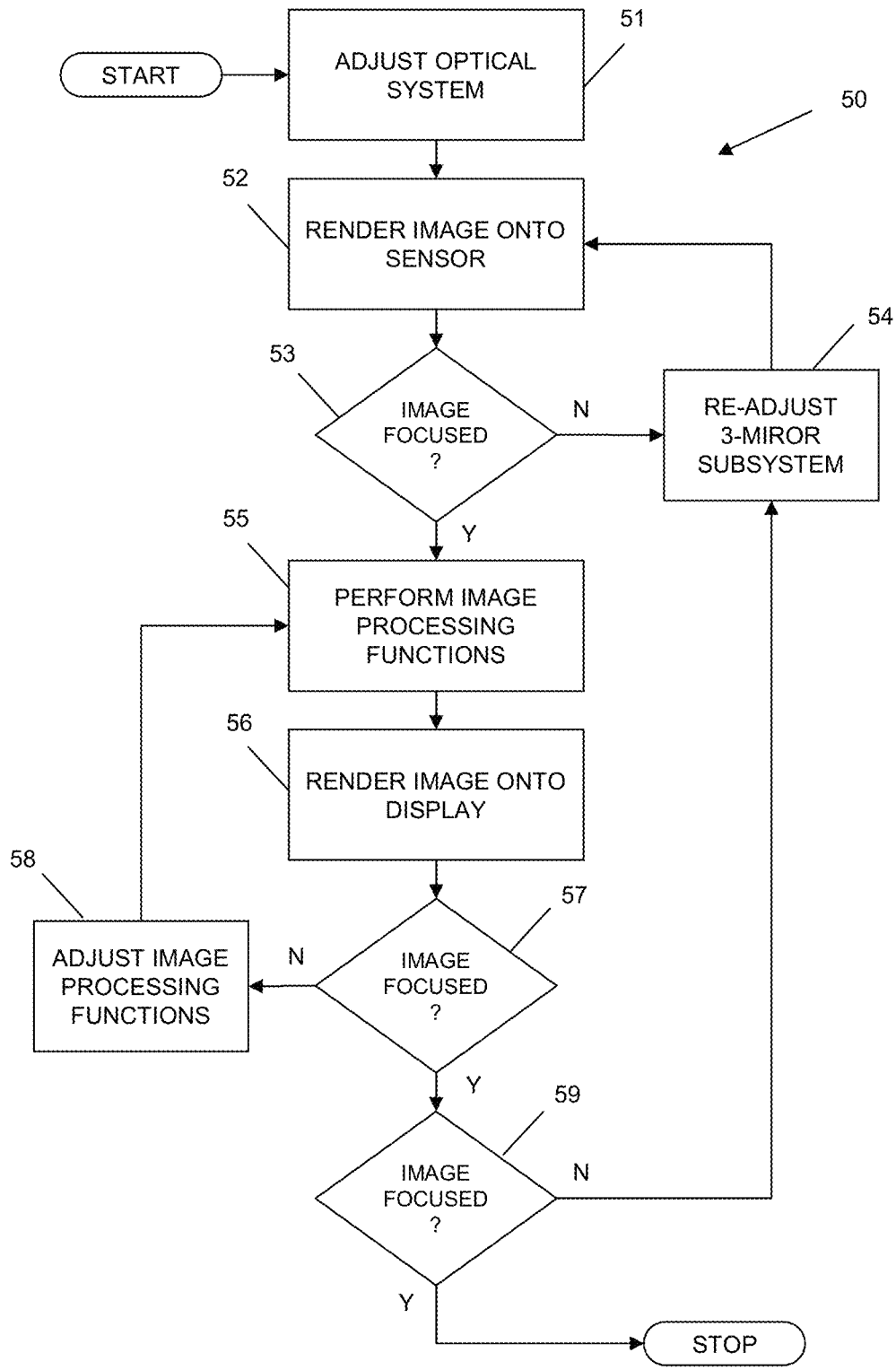
FIG. 2 shows a flow chart of method of a preferred embodiment of the present invention.

FIG. 2 shows a flow chart of an exemplary process 50 of the present invention. The process 50 includes initially adjusting an optical system 51 to capture an ultra-wide field of view and to doubly fold rays received from the field of view, and to project the doubly folded rays onto a sensor plane 52. The system receives an image at the image plane and determines an estimate of image focus 53. A controller readjusts the optical system 54 if the image is determined to be out of focus (i.e., not within a tolerable focus range). Automatic image focus detection can be accomplished using available focus detection techniques, such as edge detection.

The process 50 further includes performing image processing functions on the image 55 to further sharpen the image if the image was deemed in focus in the testing the image focus 53 step, rendering the sharpened image onto a display 56, automatically first testing the sharpened image focus 57, and readjusting the image processing functions 58 if the image is out of focus. The focus process can be parametric, focusing by adjusting the optical system 54, then focusing by image processing, and repeating one or more of either step, as may be required.

The process 50 further includes at least one of: automatically second testing the sharpened image focus, and manually second testing the sharpened image focus 59 if the sharpened image is out of focus. The process 50 concludes when each of the focus tests 54, 58, and 59 have satisfactorily passed. In some embodiments, the process is repeated in a feed back loop to track and maintain focus. Such tracking can provide improved performance for short term performance enhancements for vibrations, etc., and for long-term performance enhancements for environmental factors (e.g., temperature) and for component aging.

Figure 3A:
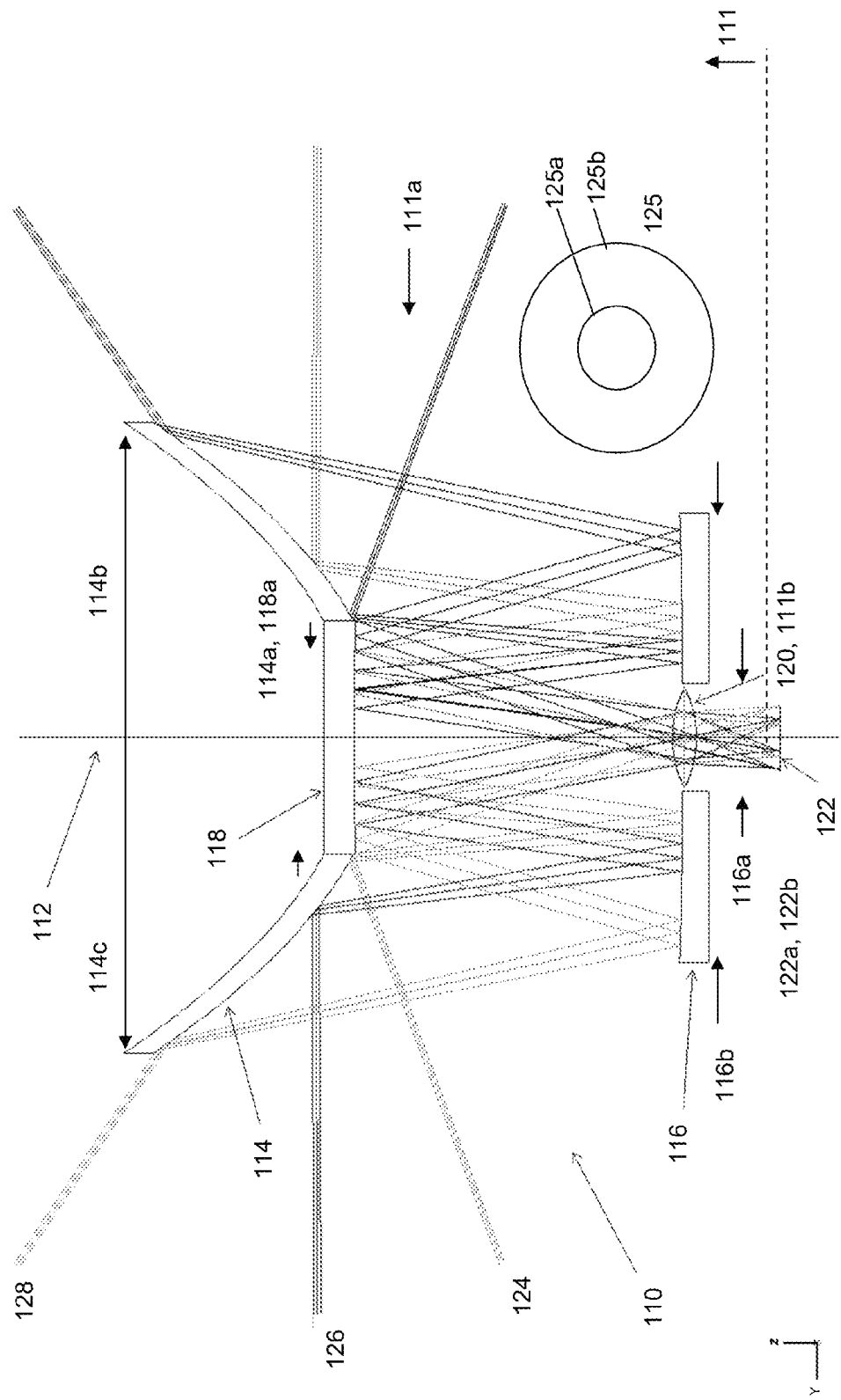
FIGS. 3A and 3B show a vertical cross-section of a one exemplary embodiment of the invention.

FIG. 3A illustrates an exemplary high resolution panoramic camera 110 having an optical axis of symmetry 112. The exemplary panoramic camera 110 includes three parts. A first part includes an optical system 111. A second part includes a digital image sensor 122, mounted to the optical system 111 in such a way that a sensor plane 122a of the digital image sensor 122 coincides with an image plane 122b of the optical system 111. A third part includes image processing software 106 (see FIG. 1).

The optical system 111 includes at least two subsystems. A first subsystem includes a three-mirror optical subsystem 111a. A second subsystem includes an optical correction element, such as a correction lens. In the exemplary embodiment, the correction lens is a refractive objective lens subsystem 111b. In some embodiments, the correction lens is a micro-projection lens 120. In the first preferred embodiment, the micro-projection lens 120 includes an ideal lens.

The three-mirror optical subsystem 111a includes a first convex aspheric mirror 114, a second mirror 116, and a third mirror 118. The mirrors 114, 116, 118 are defined by respective curves of revolution about the optical axis 112. In some embodiments, the first convex mirror is paraboloidal. In other embodiments, the first convex mirror is hyperboloidal.

In some embodiments, the first convex mirror is a high-order paraboloid. In other embodiments, the first convex mirror is a high-order hyperboloid. The high-order paraboloid and the high-order hyperboloid can be represented as axially symmetric surfaces of revolution that deviate from their corresponding second order conic sections as follows:

$$z(h) = \frac{c \cdot h^2}{1 + \sqrt{1-(1+k) \cdot c^2 \cdot h^2}} + \alpha_4 \cdot h^4 + \alpha_6 \cdot h^6 + \alpha_8 \cdot h^8 + \alpha_{10} \cdot h^{10} + \alpha_{12} \cdot h^{12} + \alpha_{14} \cdot h^{14} + \alpha_{16} \cdot h^{16} + \alpha_{18} \cdot h^{18} + \alpha_{20} \cdot h^{20}$$

The z axis is coincident with the optical axis, and h is a radial dimension in a plane perpendicular to the optical axis.

Coefficient k is a conic constant, which has a simple relation with the eccentricity c; that is, eccentricity c is the square root of the negative of k. If $\alpha_n=0$ for n=4, 6, 8, . . . , and k<−1, the surface of revolution is a hyperboloid. If k=−1, the surface of revolution is a paraboloid. If −1<k<0, the surface is ellipsoidal. If k=0, the surface is a sphere.

Deviations from second order conic sections produce high-order conic sections. Specifically, a high-order paraboloid and a high-order hyperboloid are generated when $\alpha_n$ does not equal zero for n=6, 8, 10, 12, . . . .

The first convex mirror defines a central aperture 114a disposed at one end, and centered about the central axis. In an exemplary embodiment, the first convex mirror 114 includes a convex paraboloidal mirror with a radius of curvature of 13.56 mm at its vertex. For the exemplary embodiment, the central aperture 114a includes a diameter of about 16.0 mm with a first convex mirror maximum diameter 114b of about 44.0 mm. The second mirror 116 includes a convex aspheric mirror with a radius of curvature of 2,169.0 mm, a second mirror central aperture 116a with a diameter of 10.0 mm, and a second mirror diameter 116b of 29.0 mm. The third mirror 118 includes a concave aspheric mirror with a radius of curvature of 286.0 mm and a third mirror diameter 118a of 16.0 mm, exactly equal to the first mirror central aperture 114a.

The third mirror 118 is preferably centered within the first mirror central aperture 114a and exactly displaces the first mirror central aperture 114a. Such positioning can simplify construction and performance, as the first convex mirror and third mirror can be rigidly attached to each other, so as to maintain their relative positions. In an exemplary embodiment, the first mirror 114 and the second mirror 116 are separated by a distance of 22.2 mm. The second mirror 116 and the third mirror 118 are separated by a distance of 24.5 mm. The length of the optical system 111 along the optical axis of symmetry 112 from a far end of the first mirror 114c to the image plane 122b is 50.0 mm; whereas, a ray path through the system 111 is much greater due to the double folding.

A micro-projection lens 120 can be centered in the second minor central aperture 116a. The micro-projection lens 120 has a diameter of about 3.5 mm, a focal length of about 6.7 mm, and a numerical aperture (NA) of about 0.25.

Figure 3B:
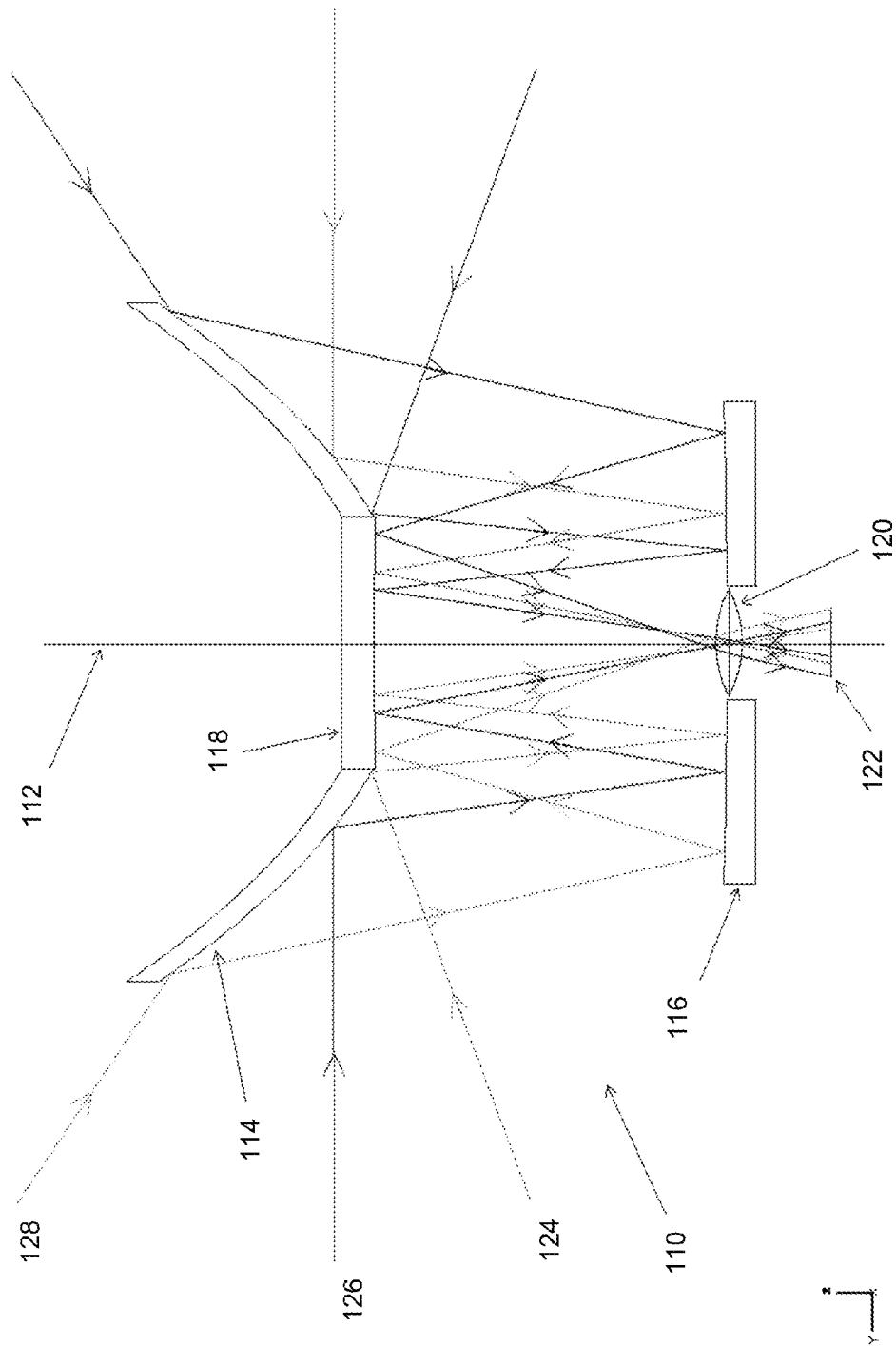

A set of ray bundles 124, 126, and 128 at angles of 68 degrees, 90 degrees, and 126 degrees, respectively, to the optical axis of symmetry 112 are traced in FIG. 3A. The optical system 111, formed by 180 degree revolution about the optical axis 112, produces a circular image 125 on the image plane 122b, wherein the image 125 is formed between an image inner circle 125a of diameter 1.83 mm and an image outer circle 125b of diameter 4.2 mm. FIG. 3B is identical to FIG. 3A, with only principle rays from each set of ray bundles 124, 126, and 128 traced.

The image inner circle 125a is defined by ray bundles 124. The interior of the image inner circle 125a is void of an image component, a result of the first mirror central aperture 114a. The image outer circle 125b is defined by ray bundles 128. No image forms outside the image outer circle 125b, limited by the far end of the first minor 114c. As a result, a field of view (FOV) for the panoramic camera 110 is substantially spherical, approaching a full $4\pi$ steradians, less two cones aligned along the optical axis of symmetry 112. The cones cut out angles of 68 degrees and 126 degrees measured with respect to the optical axis of symmetry 112.

The first convex mirror 114 introduces a field curvature to a first virtual image and compresses the first virtual image components nearer the image outer circle 125b more. Compression in the virtual image occurs both radially and circumferentially. Thus, first image components nearer the image inner circle 125a, are less compressed than first image components nearer the image outer circle 125b. This is largely a result of the smaller radius of curvature, both radially and circumferentially, of the first mirror 114 nearer its vertex. The second mirror 116 and the third mirror 118 correct a portion of the first image field curvature and first image compression produced by the first mirror 114. The second mirror 116 and the third mirror 118 reduce the length of the optical system 111 by doubly folding the optical axis of symmetry 112 and the optical paths shown with the set of ray bundles 124, 126, and 128.

The second mirror 116 and the third mirror 118 correct spherical aberration in pupils providing proper image compression and also correct coma in image. A standard optical element, such as the micro-projection lens 120, corrects for field curvature introduced by the highly convex paraboloidal mirror 114. The micro-projection lens 120 serves as an aperture and an exit pupil to the optical system 111, presenting an image 125 to the image plane 122b. An aperture of the system controls the quantity of illumination, which in turn relates to image capture speed. Generally, more light is preferred for both image quality and to provide more flexibility in image capture speed. Apertures can be described in terms of f-stop. In some embodiments, the system uses f-stops of about 2.8 or less for desirable performance.

In some embodiments, the relatively small f-stops reduce the exposure time for the panoramic camera. The reduced exposure time is particularly important in video applications, in which the panoramic camera f-stop and pixel sensitivity in the image sensor field or plane allow for video recording. In some embodiments, video rates may be one frame per one second, or greater, for stop image surveillance applications. Alternatively or in addition, video rates may be more than one frame per second. For example, standard video rates of 30 to 60 frames per second can be supported. In some embodiments, even greater video capture rates of up to and greater than 100 frames per second (FPS) are possible, as may be used in slow motion applications.

In some embodiments, image sensors provide high resolution by providing a large number of pixels (e.g., greater than about 4 Mega pixels). In some embodiments, each row and column of the digital image sensor 122 is populated with approximately 2,400 pixels with a uniform pixel size of 1.75 microns (e.g., Micron CMOS Sensor MT9E0O1I12STC, commercially available from Micron Technology, Inc. of Boise, Id.), or approximately 1,900 pixels with a uniform pixel size of 2.2 microns (Micron CMOS Sensor MT9P031I12STC), where the digital image sensor 122 is populated to cover at least the image 125 formed between the image inner circle 125a and the image outer circle 125b. The Nyquist frequency for the exemplary digital image sensor 122 is 286 $mm^{-1}$ for the former example and 227 $mm^{-1}$ for the latter. The optical spatial frequency resolution of the first preferred embodiment of the optical system 111 exceeds the spatial resolution of the digital image sensor 122, and for this reason the total resolution of the system 110 is restricted by digital sensor 122 resolution.

Figure 4:
FIG. 4 presents an image spot diagram for point source objects for the exemplary embodiment of the invention shown in FIGS. 3A and 3B.

FIG. 4 presents the spot diagram 130, which shows blur spots on the image plane 122 for point source objects for the first preferred embodiment. The central feature represents the cross section of a point spread function by image plane 122. The outer circle represents the Airy disk. The optical system is said to be diffraction limited if the spot size determined from the point spread function is contained within the Airy disk.

Spot sizes are presented for objects (OBJ) deflected from the optical axis of symmetry 112 by angles between 68 degrees and 126 degrees, corresponding to sets of ray bundles 124 and 128, respectively, as traced in FIG. 3A. Included is a corresponding radial image position (IMA) from the image plane 122b, extending from the image inner circle 125a to the image outer circle 125b. In the exemplary embodiment, spot sizes are well within Airy disk diameters, which are slightly less than about 3 microns. As a result, the resulting image 125 is diffraction limited. Wavefront aberrations for the first preferred embodiment are equal to about 0.05 wavelengths or less for the full field of view. The f-stop for the optical system 111 of the first preferred embodiment is 2.0.

Figure 5A:
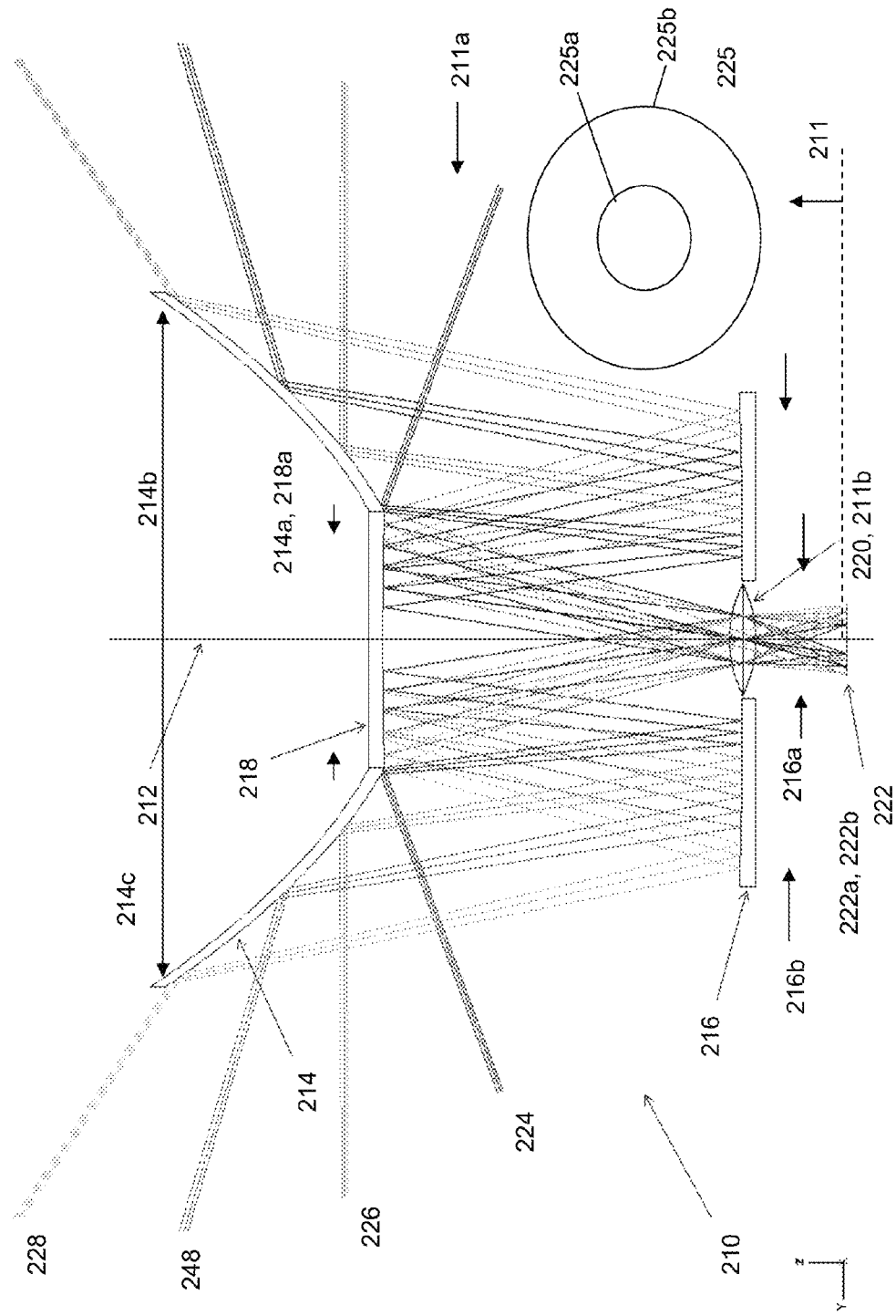
FIGS. 5A and 5B show a vertical cross-section of another exemplary embodiment of the invention.
Figure 5B:
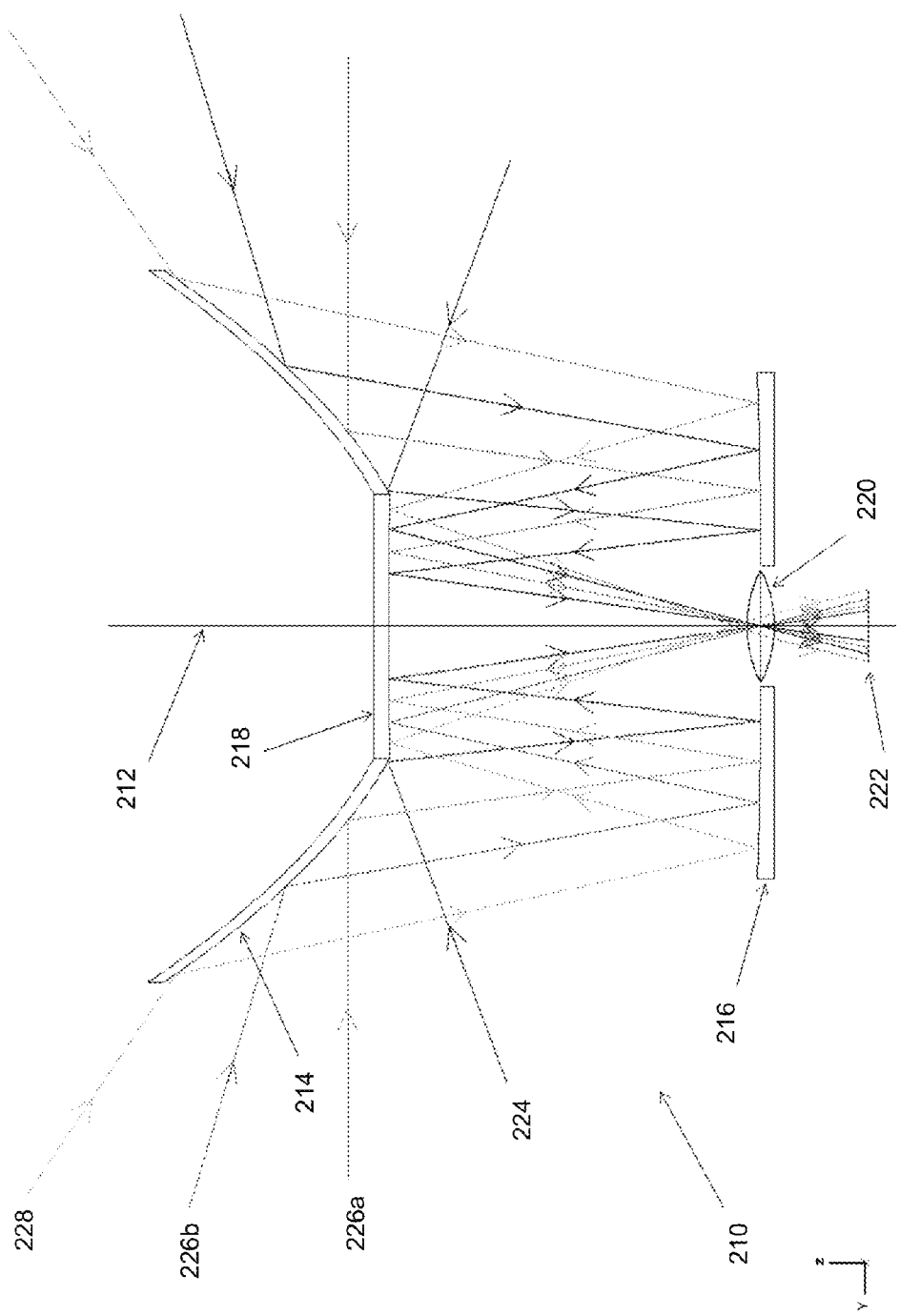

FIGS. 5A and 5B show a vertical cross-section of another exemplary embodiment of the present invention, which is functionally equivalent to the first preferred embodiment, but built to accommodate a larger image 225 and a larger digital image sensor 222, coplanar to the image 225. The digital image sensor 222 in the second preferred embodiment has a diameter of 9.0 mm.

The digital image sensor 222 contains 3.1 MegaPixels with pixel size of 3.2×3.2 microns (Micron CMOS sensor MT9T001P12STC), or 5 MegaPixels with a pixel size of 2.2×2.2 microns (Micron CMOS Sensor MT9P031I12STC), where the digital image sensor 222 is populated to cover at least the image 225 formed between the image inner circle 225a and the image outer circle 225b. The optical spatial frequency resolution of the second preferred embodiment of the optical system 211 is approximately 280 cycles/mm.

Figure 6:
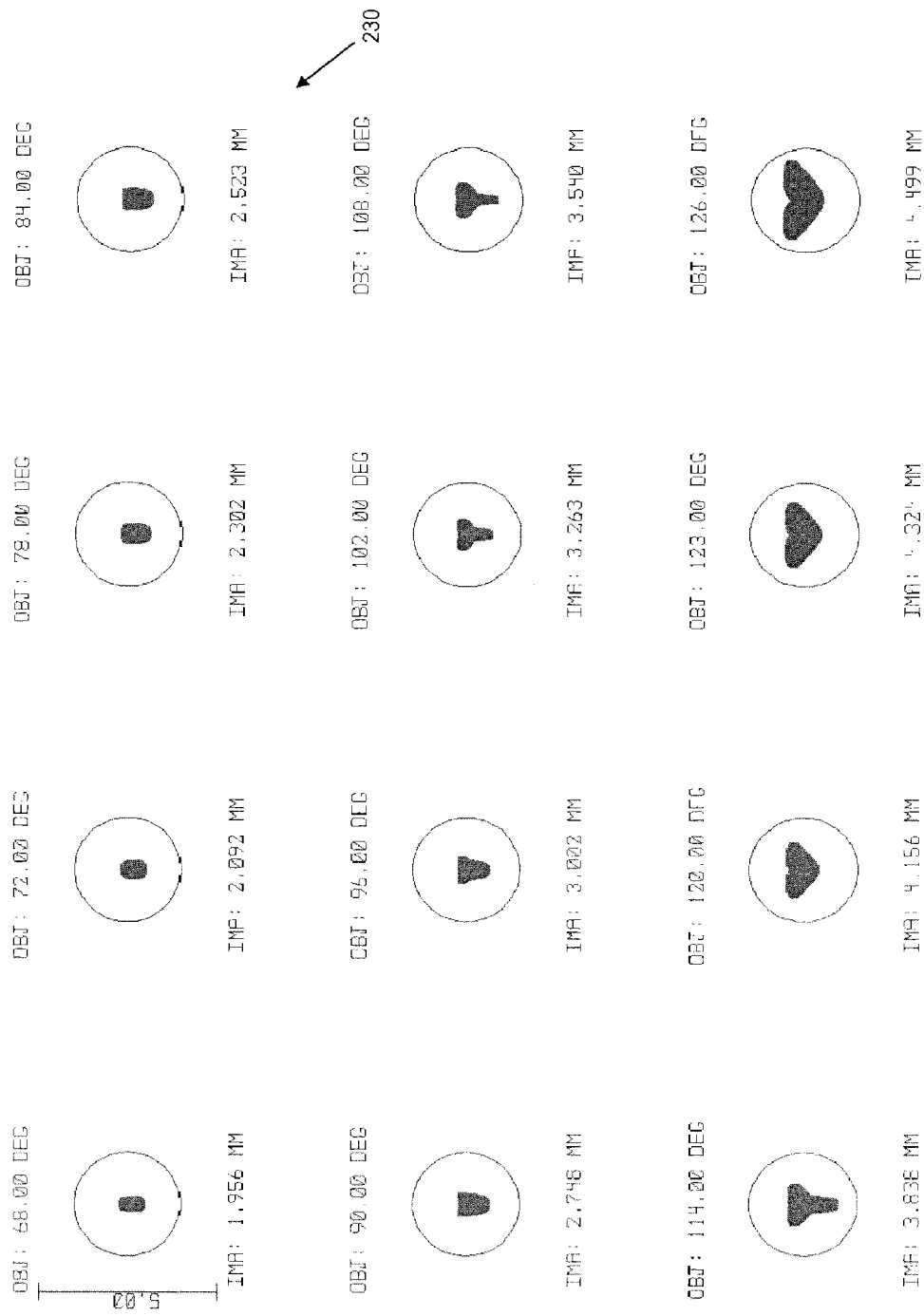
FIG. 6 presents an image spot diagram for point source objects for the exemplary embodiment of the invention shown in FIGS. 5A and 5B.

FIG. 6 presents the image spot diagram 230 for point source objects for the second preferred embodiment. Spot sizes are well within Airy disk diameters, which are approximately 3 microns. As a result, the image 225 is diffraction limited. Wave-front aberrations for the second preferred embodiment are less than 0.10 wavelengths for the full field of view. The f-stop for the optical system 211 of the second preferred embodiment is about 2.0.

Referring back to FIG. 5A, a first mirror 214 includes a convex paraboloidal mirror with a radius of curvature of 29.065 mm at its vertex, a first mirror central aperture 214a with a diameter of 34.4 mm, and a first mirror maximum diameter 214b of 94.3 mm. A second mirror 216 includes a convex aspheric mirror with a radius of curvature of 4,649.0 mm, a second mirror central aperture 216a with a diameter of 15.8 mm, and a second mirror diameter 216b of 66.2 mm. A third mirror 218 includes a concave aspheric mirror with a radius of curvature of 613.6 mm and a third mirror diameter 218a of 34.4 mm, exactly equal to the first mirror central aperture 214a.

The second mirror 216 and the third mirror 218 are separated by a distance of 52.8 mm. The length of the optical system 211 along the optical axis of symmetry 212 from a far end of the first mirror 214c to the image plane 222b is 103.2 mm.

The micro-projection lens 220 is centered in the second mirror central aperture 216a. The micro-projection lens 220 has a focal length of 14.36 mm, a hardware aperture diameter of about 7.6 mm, and a numerical aperture (NA) of 0.25. The second preferred embodiment radius of image surface curvature is about 14.96 mm.

Figure 7A:
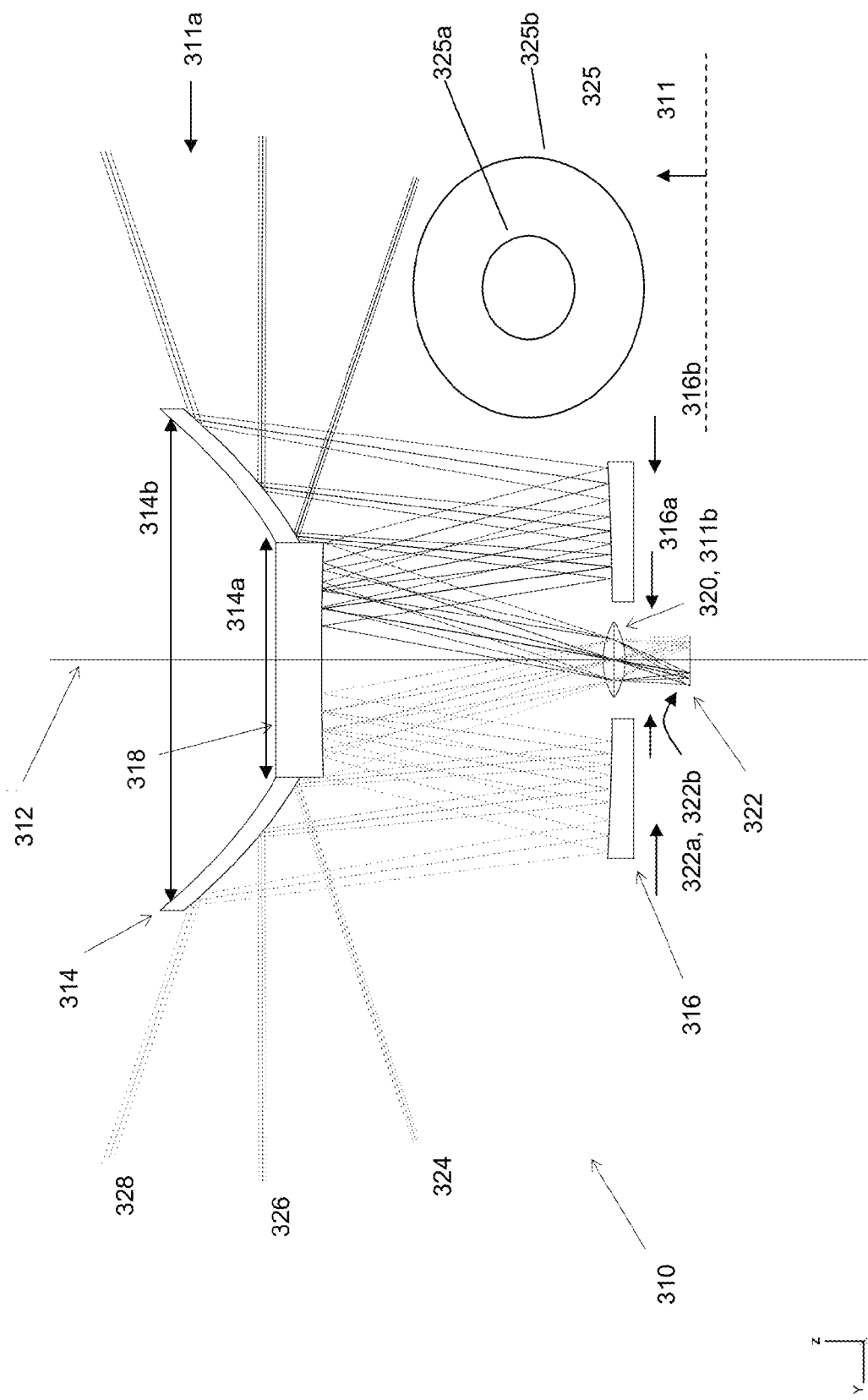
FIGS. 7A and 7B show a vertical cross-section of yet another exemplary embodiment of the invention.
Figure 7B:
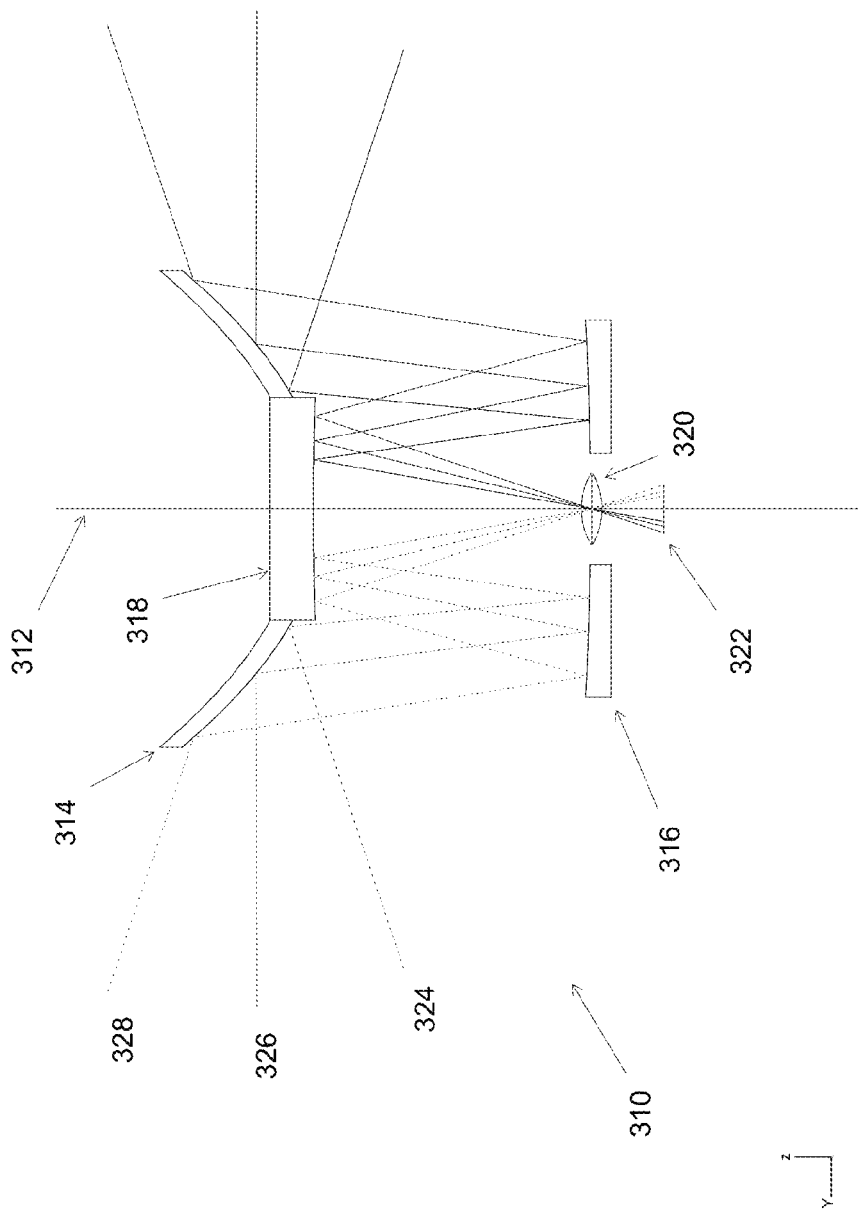

FIGS. 7A and 7B show a vertical cross-section of a third preferred embodiment of the present invention. The third preferred embodiment is a modification of the first embodiment in that a third mirror 318 is displaced from a first mirror central aperture 314a and moved closer to a second mirror 316. A set of ray bundles 324, 326, and 328 at angles of about 70 degrees, 90 degrees, and 110 degrees, respectively, measured with respect to an optical axis of symmetry 312 are traced in FIG. 7A. An image 325 is the same size as the image 125 in the first preferred embodiment given in FIG. 3A.

A three-mirror optical subsystem 311a includes a first mirror 314, a second mirror 316, and a third mirror 318. The first mirror 314 includes a purely paraboloidal mirror with a focal length of about 8.36 mm at its vertex and a first mirror maximum diameter 314b of 42.2 mm. The second mirror 316 includes a concave high-order aspheric mirror with a focal length of about 258.0 mm and a second mirror diameter 316b of about 35.0 mm. The third mirror 318 includes a concave high-order aspheric mirror with a focal length of about 144.0 mm.

The third mirror 318 is centered in the first mirror central aperture 314a. The first mirror 314 and the second mirror 316 are separated by a distance of 26.0 mm. The second mirror 316 and the third mirror 318 are separated by a distance of 27.0 mm.

An ideal micro-projection lens 320 is centered in a second mirror central aperture 316a. The micro-projection lens 320 has a focal length of about 6.7 mm. The radius of image surface curvature is about 8.5 mm.

Figure 8:
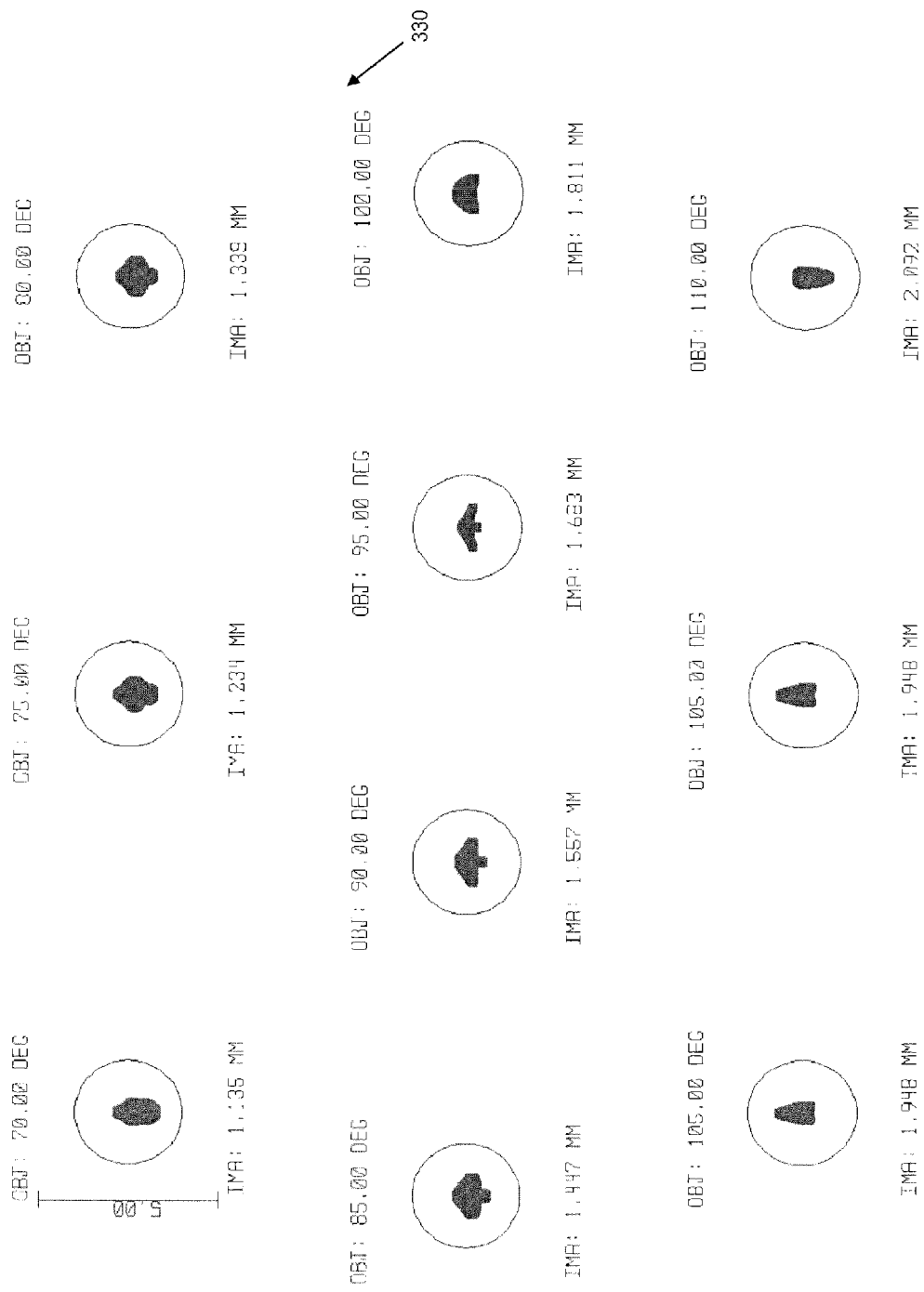
FIG. 8 presents an image spot diagram for point source objects for the exemplary embodiment of the invention shown in FIGS. 7A and 7B.

FIG. 8 presents the image spot diagram 330 for point source objects for the third preferred embodiment. The image 325 is diffraction limited. Polychromatic modulation transfer function (MTF) curves for the third preferred embodiment of the optical system 311 have a magnitude of about 0.7 at a spatial frequency of 200 cycles/mm and magnitude 0.4 at a spatial frequency of about 400 cycles/mm. The f-stop for the optical system 311 of the third preferred embodiment is 2.0.

FIGS. 9A and 9B show a vertical cross-section of a fourth preferred embodiment of the present invention. The fourth preferred embodiment is a modification of the first embodiment in that a third mirror 418 is displaced from a first mirror central aperture 414a and moved farther away from a second mirror 416. A set of ray bundles 424, 426, and 428 at angles of about 80 degrees, 100 degrees, and 110 degrees, respectively, measured with respect to an optical axis of symmetry 412 are traced in FIG. 9A. An image 425 is the same size as the image 125 in the first preferred embodiment given in FIG. 3A.

A three-mirror optical subsystem 411a includes a first minor 414, a second minor 416, and a third mirror 418. The first minor 414 includes a purely paraboloidal mirror with a focal length of about 7.0 mm. The second minor 416 includes a concave high-order aspheric mirror with a focal length of about 271.0 mm. The third minor 418 includes a concave high-order aspheric mirror with a focal length of about 148.0 mm.

The third minor 418 is centered in the first minor central aperture 414a. A micro-projection lens 420 is centered in a second minor central aperture 416a. The micro-projection lens 420 has a focal length of about 6.7 mm, approximately equal to the absolute value of the focal length of the first minor 414. The radius of image surface curvature 440 is about 7.4 mm.

Figure 10:
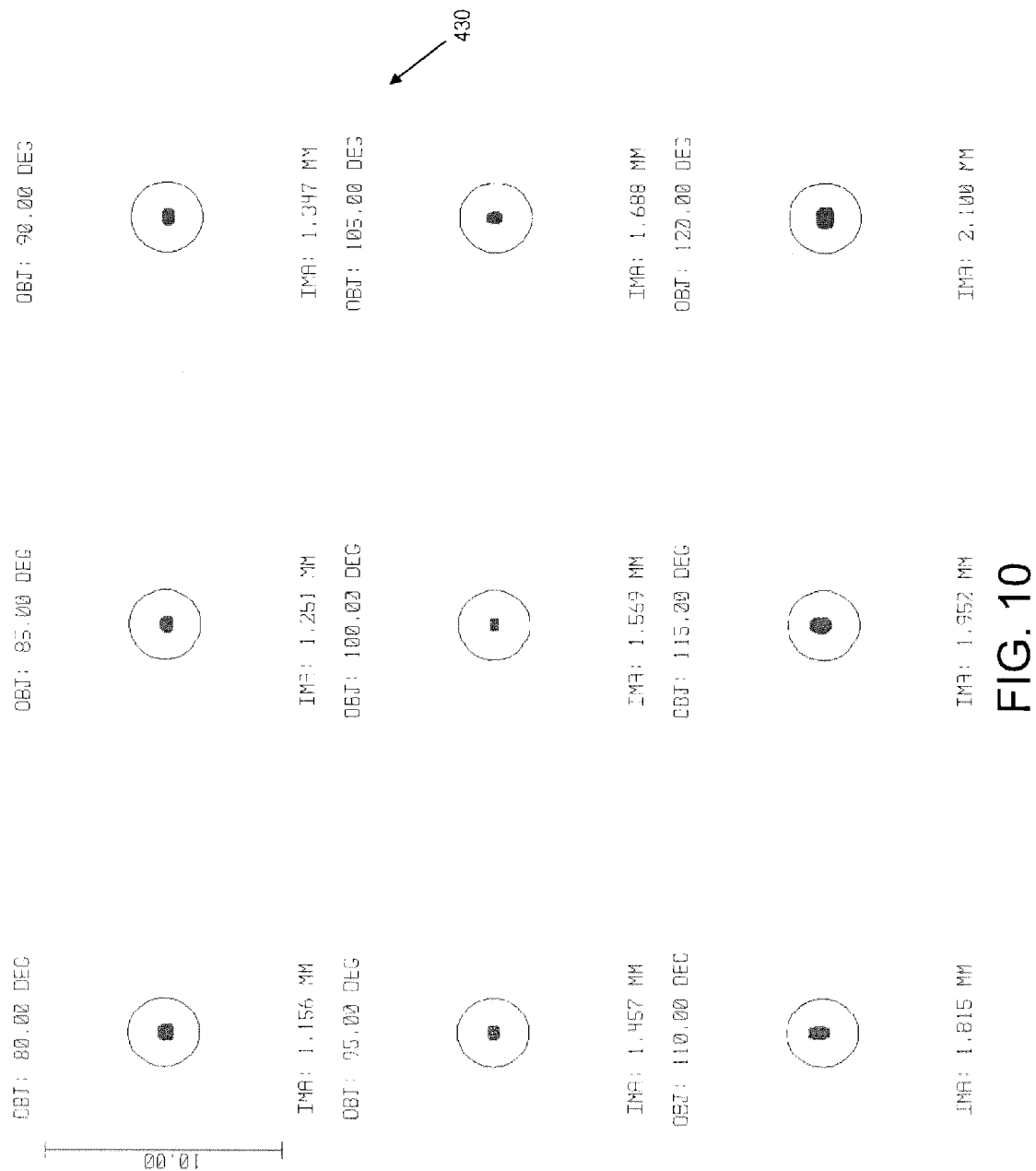
FIG. 10 presents an image spot diagram for point source objects for the exemplary embodiment of the invention shown in FIGS. 9A and 9B.

FIG. 10 presents the image spot diagram 430 for point source objects for the fourth preferred embodiment. The image 425 is diffraction limited. Wavefront aberrations for the fourth preferred embodiment are less than 0.10 wavelengths for the full field of view. The image 425 is compressed less than 10% for the full field of view. The F-stop for an optical system 411 of the fourth preferred embodiment is 2.0.

Figure 11A:
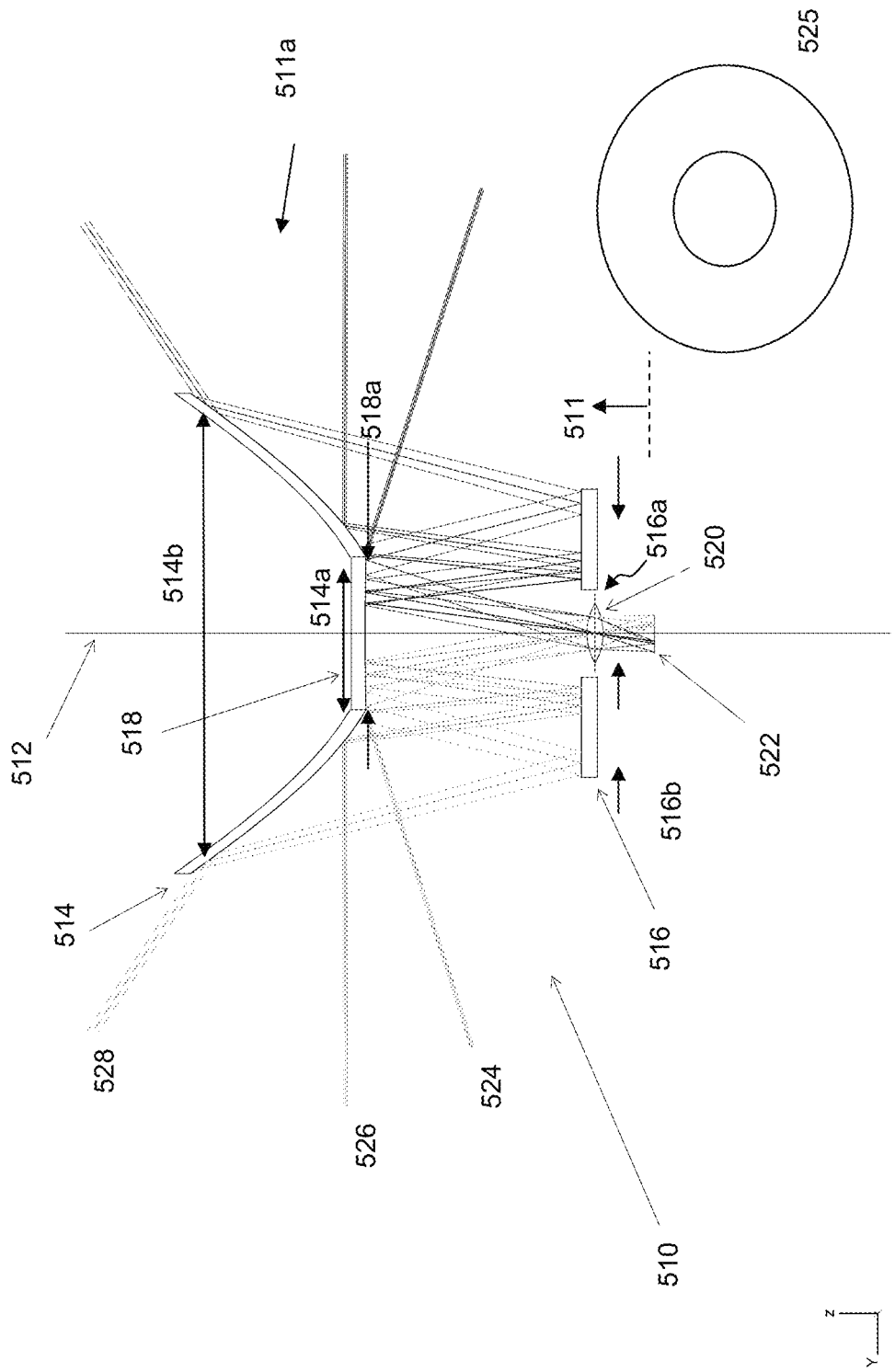
FIGS. 11A and 11B show a vertical cross-section of yet another exemplary embodiment of the invention.
Figure 11B:
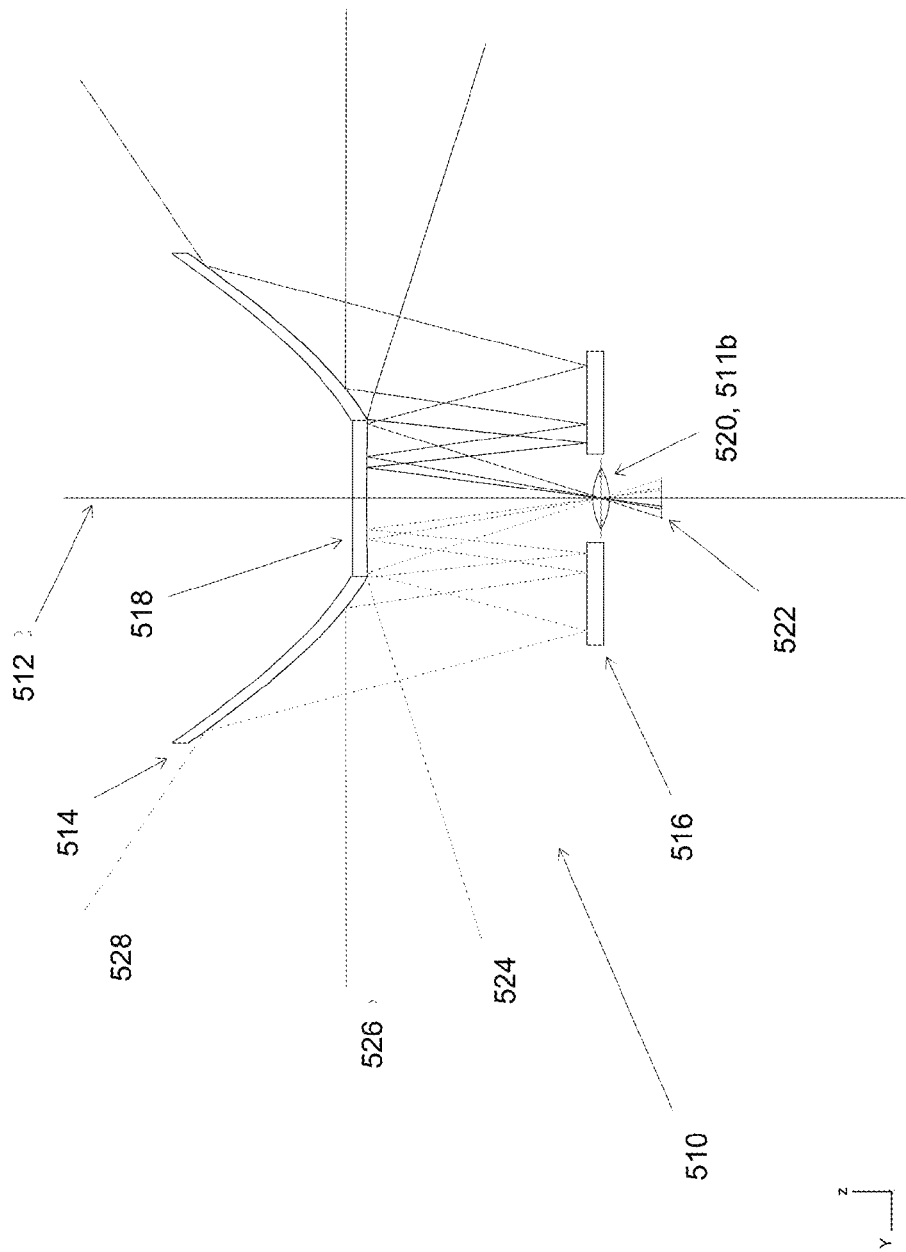

FIGS. 11A and 11B show a vertical cross-section of a fifth preferred embodiment of the present invention. The fifth preferred embodiment is a modification of the first embodiment in that a first minor 514 is a high order hyperboloidal minor and the second mirror 516 is a flat minor, so that there are only two aspheric minors 514, 518 and one flat folding minor 516 in a three-minor optical subsystem 511a. A set of ray bundles 524, 526, and 528 at angles of about 79 degrees, 90 degrees, and 126 degrees, respectively, measured with respect to an optical axis of symmetry 512 are traced in FIG. 11A. An image circle 525 is the same size as the image 125 in the first preferred embodiment given in FIG. 3A.

The three-minor optical subsystem 511a includes a first minor 514, a second mirror 516, and a third minor 518. The first minor 514 includes a high-order hyperboloidal minor with a first minor maximum diameter 514b of about 55.0 mm. The second minor 516 includes a flat minor with a second minor diameter 516b of about 33.0 mm. The third mirror 518 includes a concave high-order aspheric minor with a third minor diameter 518a of about 17.5 mm.

The third mirror 518 is centered in the first mirror central aperture 514a. The first mirror 514 and the second mirror 516 are separated by a distance of about 23.9 mm. The second mirror 516 and the third mirror 518 are separated by a distance of about 26.8 mm.

An ideal micro-projection lens 520 is centered in a second mirror central aperture 516a. The micro-projection lens 520 has a focal length of about 6.9 mm. The radius of image surface curvature 540 is about 6.35 mm.

FIG. 12 presents the image spot diagram 530 for point source objects for the fifth preferred embodiment. All spot images are inscribed by Airy disks; the image 525 is diffraction limited.

Figure 13:
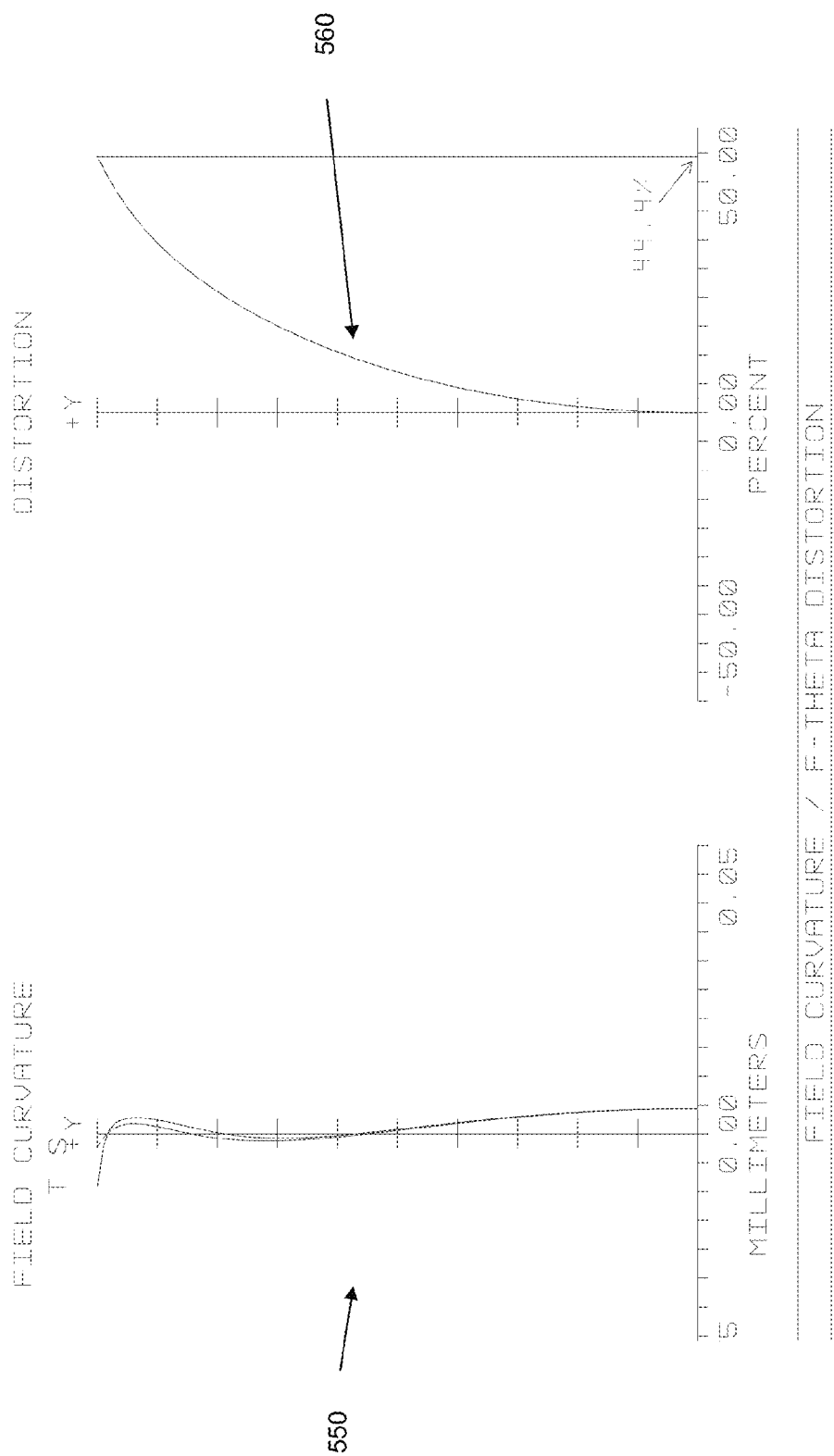
FIG. 13 presents curves for a corrected field curvature and an f-theta distortion or image compression for the exemplary embodiment of the invention shown in FIGS. 11A and 11B.

FIG. 13 presents curves for the corrected field curvature 550 and f-theta distortion or image compression 560. The coefficient of image compression at the field of view edge is 1.444, which gives a nearly 60% greater decompressed image than the standard fish-eye lens. The f-stop for the optical system 511 of the fifth preferred embodiment is about 2.0.

Figure 14B:
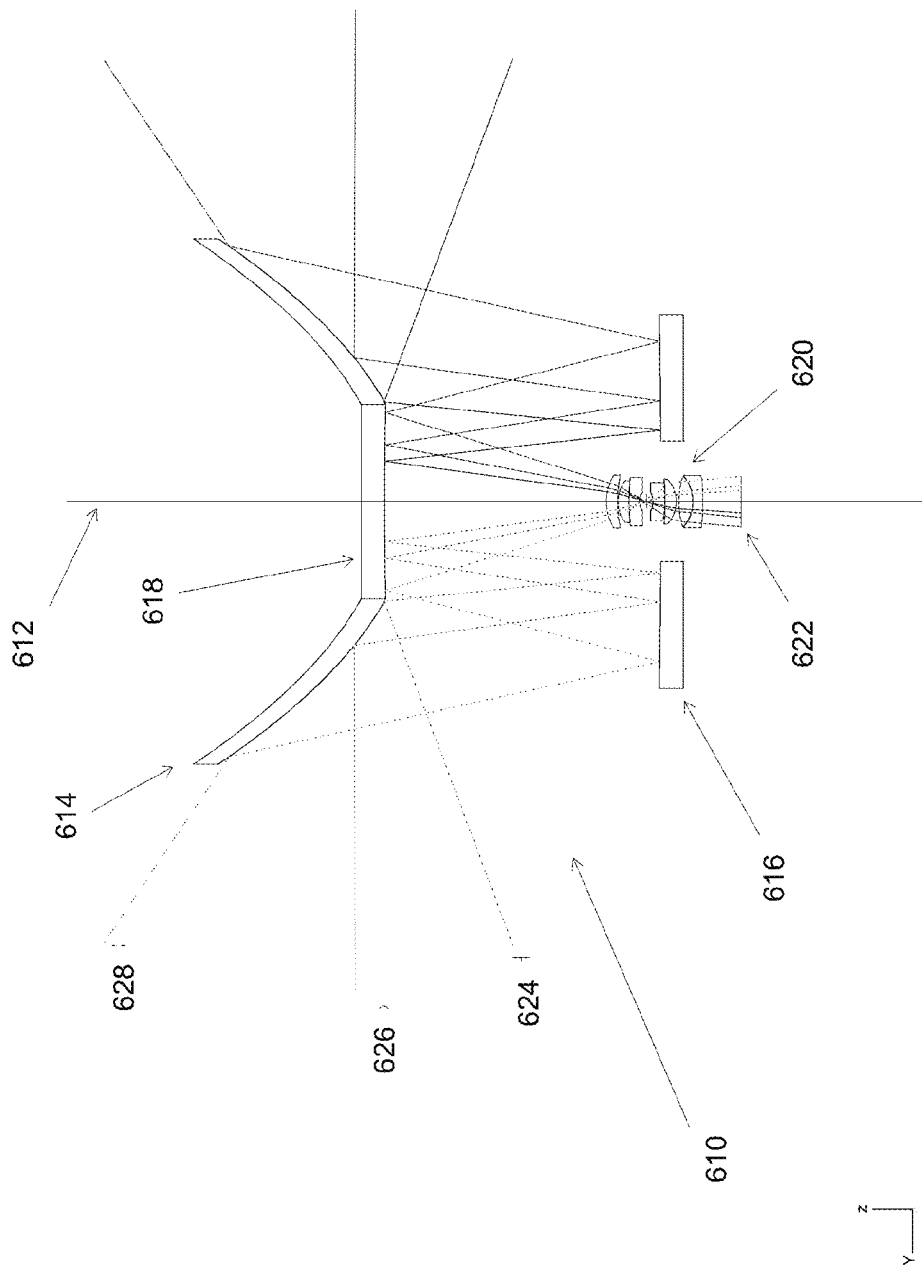

FIGS. 14A and 14B show a vertical cross-section of a sixth preferred embodiment of the present invention. The sixth preferred embodiment is a modification of the first embodiment in that the ideal micro-projection lens 120 in the first preferred embodiment is replaced with a micro-projection lens 620 that is a modified double Gauss objective lens. A set of ray bundles 624, 626, and 628 at angles of about 68 degrees, 90 degrees, and 126 degrees, respectively, to an optical axis of symmetry 612 are traced in FIG. 14A. An image 625 is the same size as the image 125 in the first preferred embodiment given in FIG. 3A.

A three-minor optical subsystem 611a includes a first mirror 614, a second mirror 616, and a third mirror 618. The first mirror 614 includes a paraboloidal mirror with a focal length of about 6.78 mm at its vertex and a first mirror maximum diameter 614b of about 43.0 mm. The second mirror 616 includes an aspheric mirror with a focal length of about 1,085.0 mm and a second mirror diameter 616b of about 27.4 mm. The third mirror 618 includes a concave aspheric mirror with a focal length of about 143.0 mm and a third mirror diameter 618a of about 16.0 mm.

The third mirror 618 is centered in the first mirror central aperture 614a. The length of an optical system 611 along the optical axis of symmetry 612 from a far end of the first mirror 616c to an image plane 622b is about 49.0 mm.

The micro-projection lens 620 is centered in a second mirror central aperture 616a. The micro-projection lens 620, represented as a modified double Gauss objective lens, includes seven lens elements and five optical components, three singlets and two doublets. The micro-projection lens diameters range from 4.5 mm up to 5.0 mm. The micro-projection lens 620 has a focal length of about 7.1 mm.

A standard double Gauss objective lens includes six lens elements and four optical components, two internal doublets and two outer singlets. To provide the modified double Gauss objective lens used in the sixth preferred embodiment, the second internal doublet in the standard double Gauss objective lens is replaced by two singlets and the second outer singlet in the standard double Gauss objective lens is replaced by a doublet. The micro-projection lens 620 corrects field curvature introduced by the highly curved paraboloidal mirror 614 and corrects its own internal aberrations.

Figure 15:
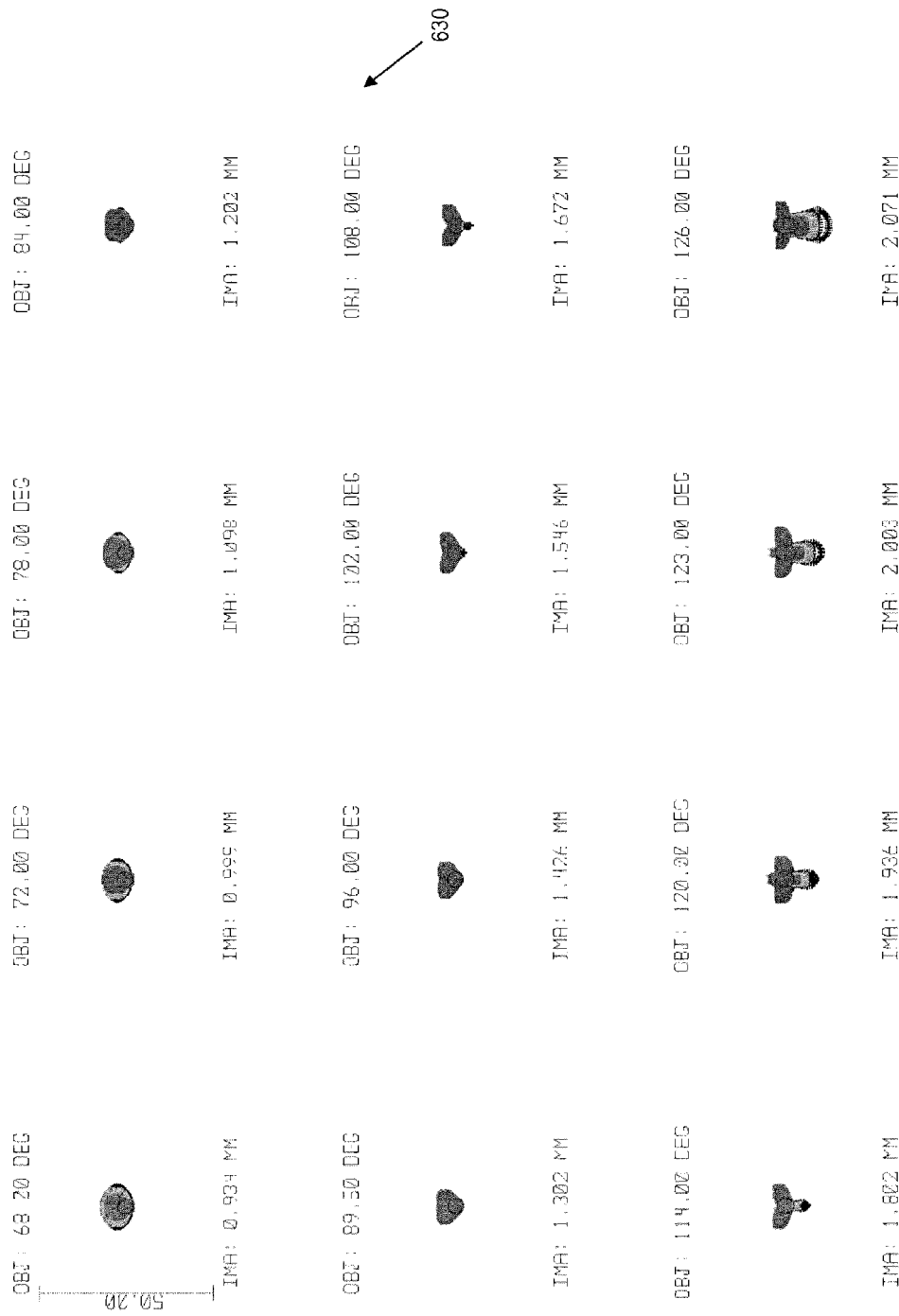
FIG. 15 presents an image spot diagram for point source objects for the exemplary embodiment of the invention shown in FIGS. 14A and 14B.

FIG. 15 presents the image spot diagram 630 for point source objects for the sixth preferred embodiment. Optical resolution of the optical system 611 is no less than 200 cycles/mm. MTF equals 0.50 for this spatial frequency.

Figure 16:
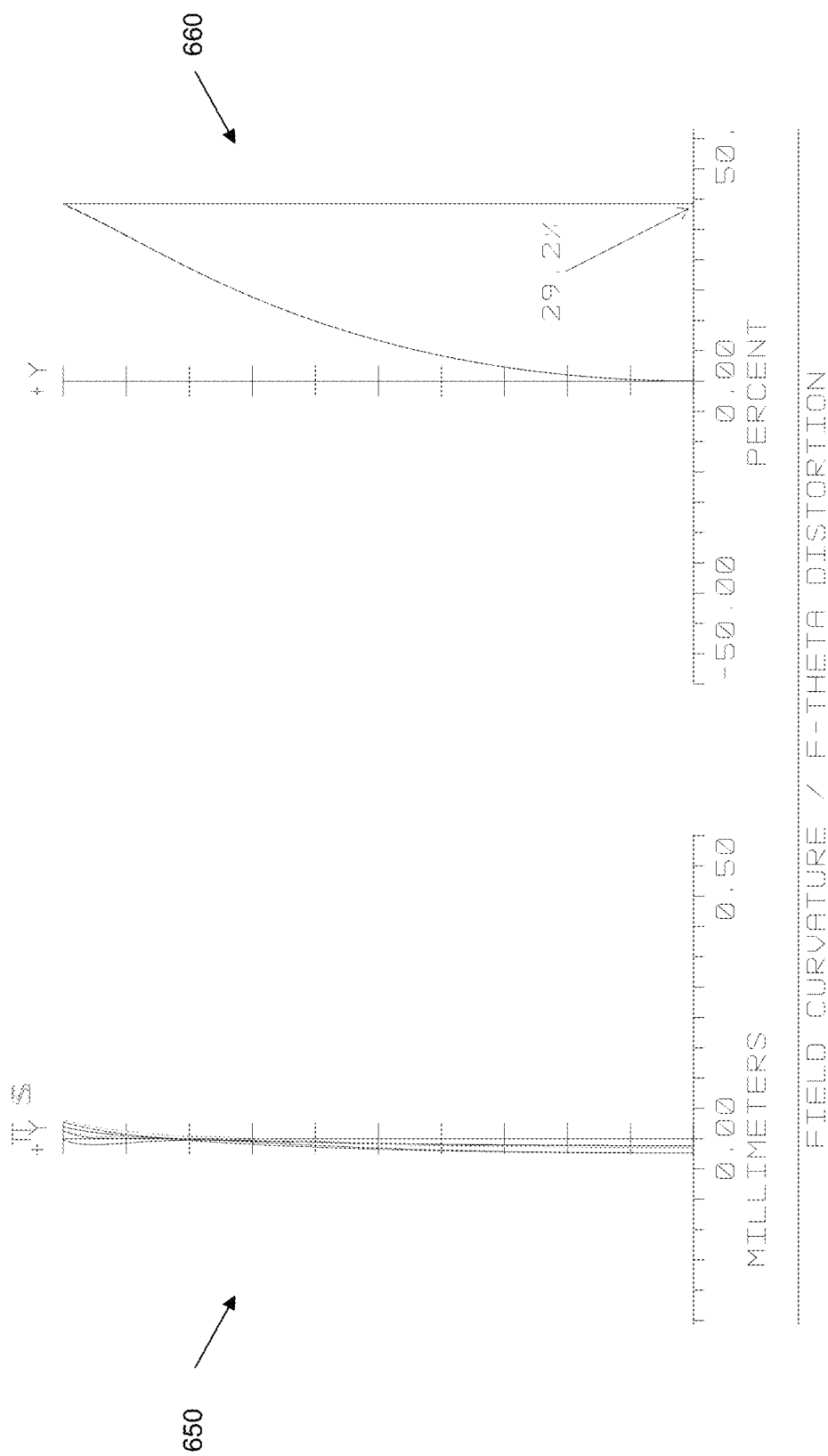
FIG. 16 presents curves for a corrected field curvature and an f-theta distortion or image compression for the exemplary embodiment of the invention shown in FIGS. 14A and 14B.

FIG. 16 presents curves for the corrected field curvature 650 and f-theta distortion or image compression 660. The corrected field curvature of the image 625 is reduced to 0.015 mm$^{-1}$ or less for the full field of view. The coefficient of image compression at the field of view edge is 1.292. The f-stop for the optical system 611 of the sixth preferred embodiment is 2.8.

Figure 17A:
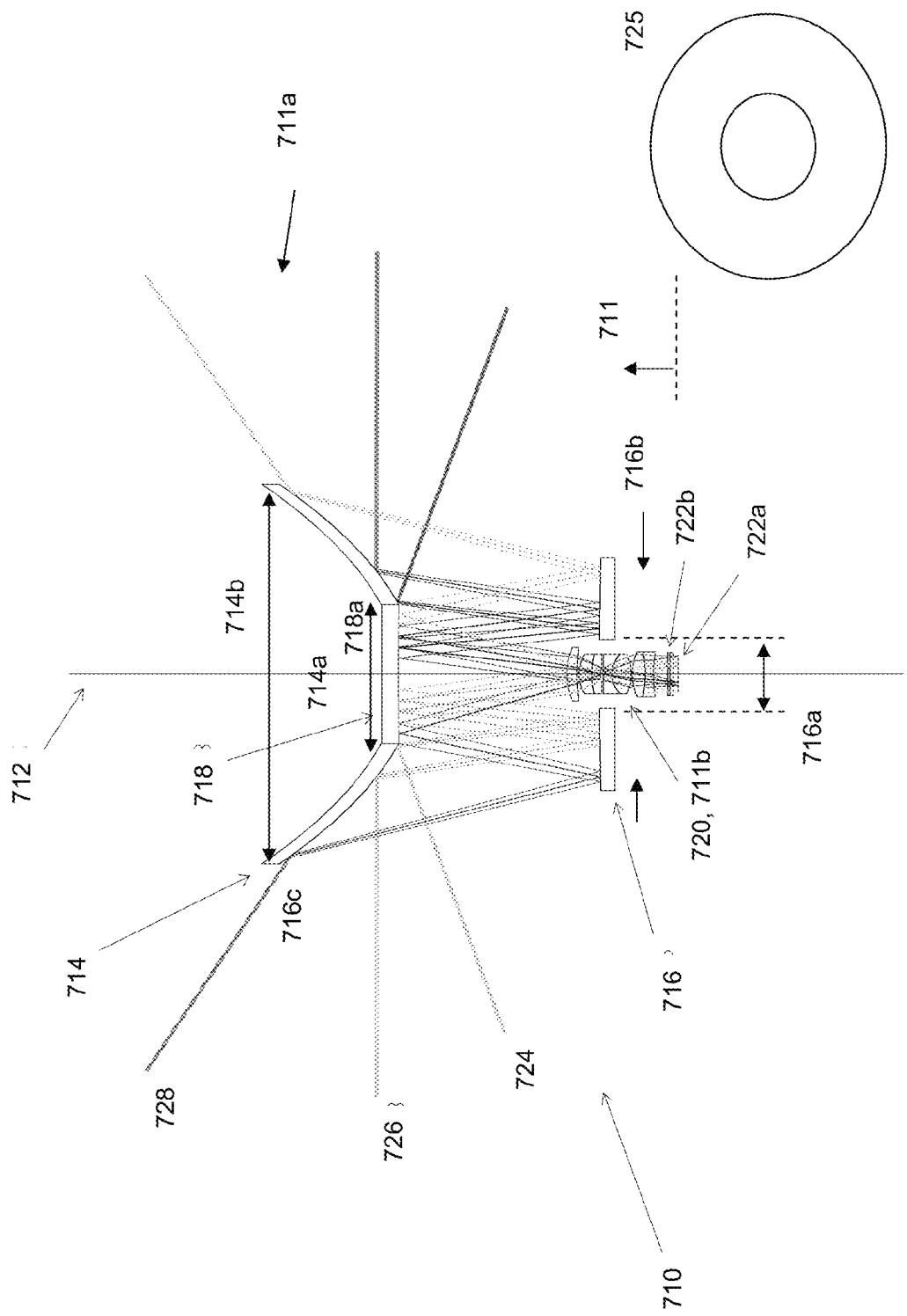
FIGS. 17A and 17B show a vertical cross-section of still another exemplary embodiment of the present invention.
Figure 17B:
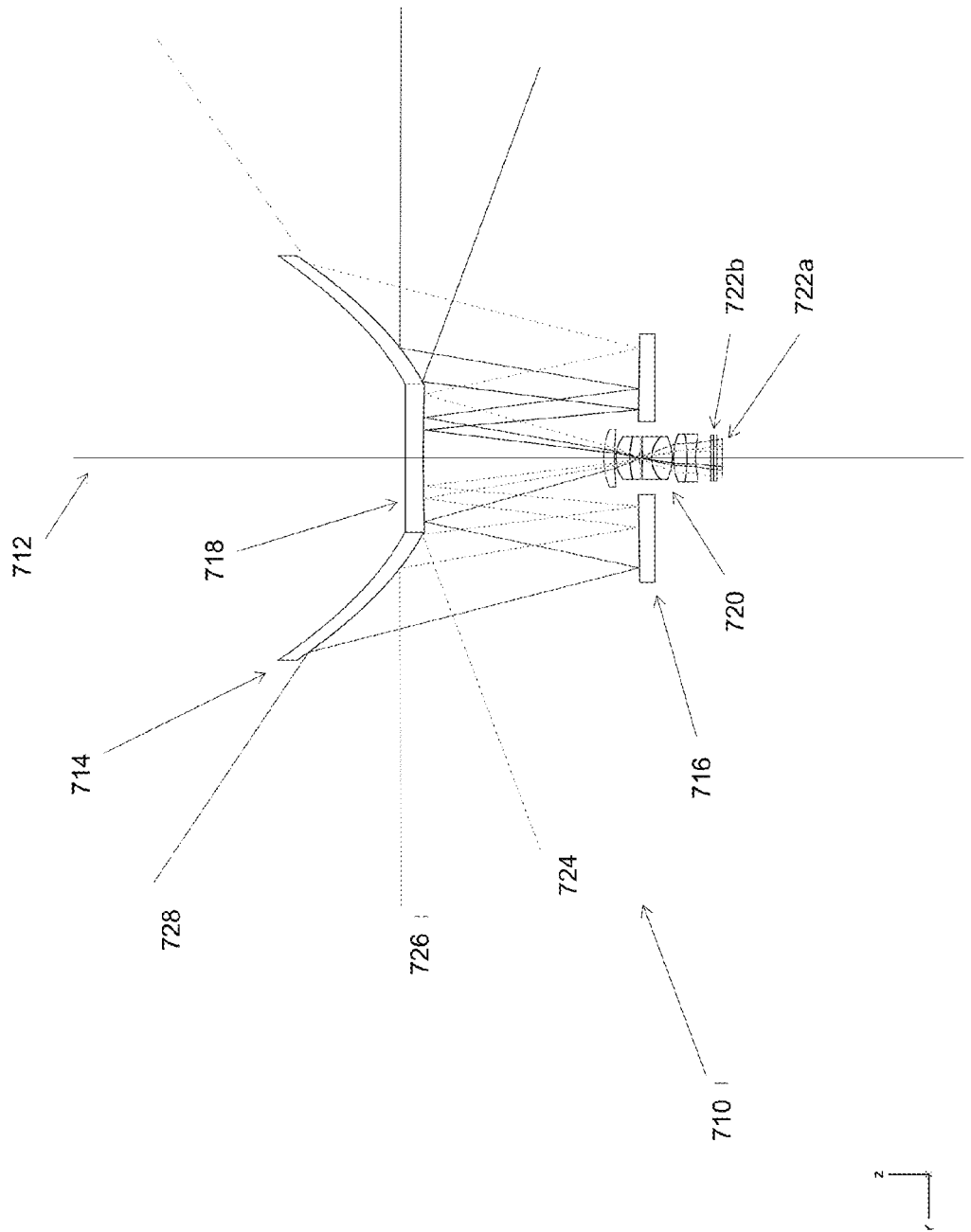

FIGS. 17A and 17B show a vertical cross-section of a seventh preferred embodiment of the present invention. The seventh preferred embodiment is a modification of the sixth embodiment in that the micro-projection lens 620 modified double Gauss objective lens is replaced with a further modified micro-projection lens 720. A set of ray bundles 724, 726, and 728 at angles of about 68 degrees, 90 degrees, and 126 degrees, respectively, measured with respect to an optical axis of symmetry 712 are traced in FIG. 17A. An image 725 is the same size as the image 125 in the first preferred embodiment given in FIG. 3A.

A three-mirror optical subsystem 711a includes a first mirror 714, a second mirror 716, and a third mirror 718. The first mirror 714 includes a paraboloidal minor with a focal length of about 7.02 mm at its vertex and a first mirror maximum diameter 714b of about 44.0 mm. The second mirror 716 includes a convex aspheric mirror with a focal length of about 103.0 mm and a second mirror diameter 716b of about 27.0 mm. The third mirror 718 includes a concave aspheric mirror with a focal length of about 123.5 mm and a third mirror diameter 718a of about 16.1 mm.

The third mirror 718 is centered in the first mirror central aperture 714a. The first mirror 714 and the second mirror 716 are separated by a distance of about 22.9 mm. The second minor 716 and the third mirror 718 are separated by a distance of about 25.2 mm. The length of an optical system 711 along the optical axis of symmetry 712 from a far end of the first mirror 716c to an image plane 722b is about 53.0 mm.

The micro-projection lens 720 is centered in a second mirror central aperture 716a. The micro-projection lens 720, represented as a further modified double Gauss objective lens, includes seven lens elements and four optical components, one singlet and three doublets. The micro-projection lens 720 has a focal length of about 8.0 mm.

Figure 18:
FIG. 18 presents an image spot diagram for point source objects for the exemplary embodiment of the invention shown in FIGS. 17A and 17B.

FIG. 18 presents the image spot diagram 730 for point source objects for the seventh preferred embodiment. All root-mean-square (RMS) spot diameters are less than about 3.0 microns, compared to about a 4.2 micron Airy disk diameter. The image 725 in the preferred seventh embodiment is diffraction limited, or close to it. Optical resolution of the optical system 711 is about 200 cycles/mm or more for an MTF of about 0.50.

Figure 19:
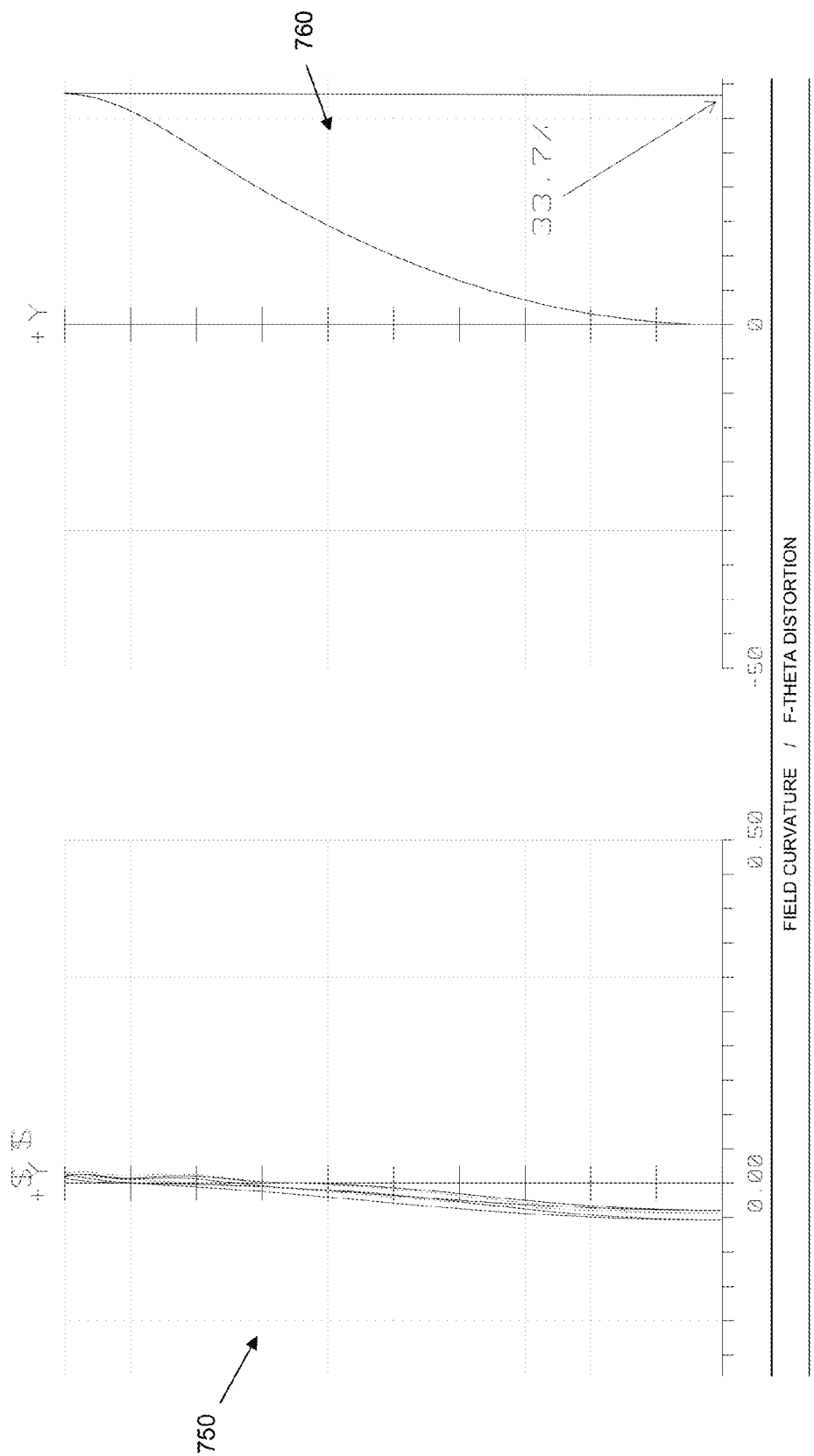
FIG. 19 presents curves for a corrected field curvature and an f-theta distortion or image compression for the exemplary embodiment of the invention shown in FIGS. 17A and 17B.

FIG. 19 presents curves for the corrected field curvature 750 and f-theta distortion or image compression 760. Image compression at the field of view edge is about 33.7%. The f-stop for the optical system 711 of the seventh preferred embodiment is about 2.8.

The point of intersection of the principal rays, traced in FIG. 17B, is at the center of the micro-projection lens 720 aperture, which is located between the micro-projection lens 720 first and second doublet. The point of intersection plays a significant role in image formation by filtering rays entering the optical system 711. The seventh preferred embodiment demonstrates that different micro-projection lens constructions can be used to resolve ray traces from the three-mirror subsystems of the present invention.

The first through seventh preferred embodiments of the present invention further comprise processing the images 125-725 approximately with image processing functions to further correct for field curvature, image compression, and spherical aberration in images 125-725 and to render a perspective panoramic view by unwrapping the images 125-725. Processing images 125-725 is provided for in at least one of: software, hardware, firmware, FPGAs, PLAs, and combinations thereof.

In some embodiments, the panoramic camera is configured to receive incident radiation in one or more bands of the electromagnetic spectrum. For example, the panoramic camera can be configured to operate in the visible spectrum, the near infrared (IR) spectrum, the middle and far IR spectrum, the ultraviolet spectrum, and even other regions of the spectrum. In some embodiments, the optical subsystem is broad spectrum, operating over multiple bands; whereas, the image sensor is selected for operation in one or more of the desired bands.

All publications, patents, and patent applications mentioned in this specification are herein incorporated by reference to the same extent as if each individual publication, patent, or patent application was specifically and individually indicated to be incorporated by reference.

While the invention has been described in connection with the specific embodiments thereof, it will be understood that it is capable of further modification. Furthermore, this application is intended to cover any variations, uses, or adaptations of the invention, including such departures from the present disclosure as come within known or customary practice in the art to which the invention pertains, and as fall within the scope of the appended claims.

What is claimed is:

1. An apparatus adapted for producing an image of objects in an ultra-wide field of view angle, comprising:
   an optical subsystem comprising:
   a first convex aspheric mirror defining a central aperture and an optical axis;

a second aspheric mirror defining a central aperture, the second aspheric mirror disposed along the optical axis relative to the first convex aspheric mirror; and a third aspheric mirror also disposed along the optical axis at or near the first convex aspheric mirror central aperture;

wherein the image of objects in the ultra-wide field of view angle is correctable by a standard optical element, to produce on an image plane the image having an optical resolution equal to or exceeding the Nyquist sampling criterion for the image sensor captured the optical image and adjusted to the image plane.

2. The apparatus of claim 1, wherein the image has an optical resolution equal to or greater than 40 lines or cycle pairs per mm.

3. The apparatus of claim 1, wherein the ultra-wide field of view is greater than 250 degrees.

4. The apparatus of claim 1, wherein the apparatus has an f-stop of 4.0 or less.

5. The apparatus of claim 1, wherein a combination of the second aspheric mirror and the third aspheric mirror provides for double optical folding to shorten an extent of the three-mirror optical subsystem along an optical axis.

6. The apparatus of claim 5, wherein a ratio of the extent of the three-mirror optical subsystem along an optical axis to a first convex aspheric mirror diameter is 1.2 or less.

7. The apparatus of claim 1, wherein a surface of the first convex aspheric mirror is selected from the group of surfaces consisting of: a paraboloid, a hyperboloid, a high-order paraboloid, and a high-order hyperboloid.

8. The apparatus of claim 1, wherein the second aspheric mirror has a power selected from the group of powers consisting of a positive optical power, a negative optical power, and a zero optical power.

9. The apparatus of claim 1, wherein the third aspheric mirror is concave.

10. The apparatus of claim 1, wherein the standard optical element is a correction lens.

11. The apparatus of claim 10, wherein the correction lens comprises a micro-projection lens.

12. The apparatus of claim 10, wherein the correction lens comprises a compound lens.

13. The apparatus of claim 12, wherein the compound lens comprises one of: a double Gaussian objective lens and a modified double Gaussian objective lens.

14. The apparatus of claim 1, further comprising a digital image sensor positioned at the image plane, configured to receive the image produced thereon.

15. A method of projecting onto an image sensor plane an image of one or more objects in an ultra-wide field of view, comprising:
(a) reflecting by a first convex aspheric mirror one or more objects in the ultra-wide field of view to provide a first virtual image;
(b) reflecting the first virtual image with a second aspheric mirror to form a second image, wherein reflecting the first virtual image comprises correcting one or more of a first image field curvature and a first image compression;
(c) reflecting the second image with a third aspheric mirror to form a third image, wherein reflecting the second image comprises correcting one or more of a second image field curvature and a second image compression; and
(d) focusing the third image with an optical correction element to project a diffraction limited image having an optical resolution equal to or exceeding the Nyquist sampling criterion of a digital sensor.

16. The method of claim 15, wherein the diffraction limited image has a residual field curvature approximating a flat field and a substantially uniform illumination of the image sensor plane for f-stops of 4.0 or less.

17. The method of claim 15, wherein focusing the third image comprises correcting one or more of: a third image field curvature, a third image compression, a third image astigmatism, a third image coma, a third image third-order spherical aberration, and a third image set of higher-order spherical aberrations.

18. The method of claim 15, wherein focusing the third image comprises focusing with a correction lens.

19. The method of claim 15, wherein the correcting in (b) and (c) comprises adjusting at least one of: a shape, a diameter, and a focal length independently for each of the first, second, and third aspheric mirrors.

20. The method of claim 15, wherein focusing the third image comprises adjusting at least one of: a shape, a diameter, a focal length, and an index of refraction for at least one of the plurality of lens elements of the correction lens.

21. The method of claim 15, wherein the diffraction limited image comprises an image compression coefficient between 1.2 and 1.5 for the ultra-wide field of view.

22. The method of claim 15, wherein the diffraction limited image has a polychromatic modulation transfer function (MTF) equal to or greater than 0.30 for a spatial frequency equal to or greater than 40 cycles/ mm.

23. The method of claim 15, further comprising capturing the diffraction limited image with a digital image sensor.

24. The method of claim 23, further comprising processing the captured image with image processing functions to further correct the diffraction limited image.

25. The method of claim 23, wherein capturing the diffraction limited image comprises capturing an image in at least one of a visible band, a UV band, an IR band.

26. The method of claim 15, wherein the ultra-wide field of view is omni-directional and orthogonal to the optical axis.

27. The method of claim 26, wherein the ultra-wide field of view is equal to or greater than 250 degrees along the optical axis, with a central blockage region.

28. The method of claim 27, wherein blockage region extends not more than 68 degrees measured from the optical axis.

29. The method of claim 16, wherein the f-stops of 4.0 or less provide exposure times short enough to accommodate for video recording at frame rates equal to or greater than 100 frames per second (FPS).

30. An apparatus adapted for producing an approximately undistorted image of objects in an ultra-wide field of view angle, comprising:
means for reflecting by a first convex aspheric mirror one or more objects in the ultra-wide field of view to provide a first virtual image;
means for reflecting the first virtual image with a second aspheric mirror to form a second image, wherein reflecting the first virtual image comprises correcting one or more of a first image field curvature and a first image compression;
means for reflecting the second image with a third aspheric mirror to form a third image, wherein reflecting the second image comprises correcting one or more of a second image field curvature and a second image compression; and
means for focusing the third image with an optical correction element to project a diffraction limited image having an optical resolution of equal to or exceeding the Nyquist sampling criterion of an image detector.

31. A panoramic camera capturing an ultra-wide field of view, comprising:
- a convex aspheric mirror disposed along an optical axis;
- at least one other aspheric mirror also disposed along the optical axis;
- an image detector positioned in an image plane; and
- an optical correction element receiving rays reflected at least once by each of the convex aspheric mirror and the at least one other aspheric minor, producing on the image plane an image having an optical resolution equal to or exceeding the Nyquist sampling criterion of an image detector.

32. The apparatus of claim 31, wherein the apparatus has an f-stop of 4.0 or less.

* * * * *